(12) United States Patent
Sundaram et al.

(10) Patent No.: US 9,969,619 B2
(45) Date of Patent: May 15, 2018

(54) CARBON MATERIALS COMPRISING CARBON NANOTUBES AND METHODS OF MAKING CARBON NANOTUBES

(75) Inventors: Rajyashree Sundaram, Chitlapakam Chennai Tamil Nadu (IN); Krzysztof Kazimierz Koziol, Cambridge (GB); Agnieszka Ewa Lekawa-Raus, Cambridge (GB); Alan Windle, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 1242 days.

(21) Appl. No.: 13/882,721

(22) PCT Filed: Nov. 2, 2011

(86) PCT No.: PCT/GB2011/001549
§ 371 (c)(1),
(2), (4) Date: Jul. 30, 2013

(87) PCT Pub. No.: WO2012/059716
PCT Pub. Date: May 10, 2012

(65) Prior Publication Data
US 2013/0309473 A1   Nov. 21, 2013

(30) Foreign Application Priority Data
Nov. 2, 2010 (GB) .................................. 1018498.4

(51) Int. Cl.
*B32B 9/00* (2006.01)
*C01B 31/02* (2006.01)
(Continued)

(52) U.S. Cl.
CPC ......... *C01B 31/0226* (2013.01); *B01J 23/745* (2013.01); *B01J 35/006* (2013.01);
(Continued)

(58) Field of Classification Search
CPC . C01B 31/022–31/0293; Y10T 428/30; H01B 1/04; H01B 1/24
(Continued)

(56) References Cited

U.S. PATENT DOCUMENTS

2004/0150312 A1* 8/2004 McElrath ............... B82Y 10/00
                                                    313/310
2004/0234445 A1   11/2004 Serp
(Continued)

FOREIGN PATENT DOCUMENTS

CN              101723349 A        6/2010
WO         WO 1998/39250           9/1998
(Continued)

OTHER PUBLICATIONS

Barreiro et al., 2007 Carbon 45:55-61, "Control of the single-wall carbon nanotube mean diameter in sulphur promoted aerosol-assisted chemical vapour deposition".
(Continued)

*Primary Examiner* — Daniel H Miller
(74) *Attorney, Agent, or Firm* — Swanson & Bratschun, L.L.C.

(57) ABSTRACT

The present invention relates to carbon materials comprising carbon nanotubes, powders comprising carbon nanotubes and methods of making carbon nanotubes. In the methods of the present invention, the size and/or formation of floating catalyst particles is closely controlled. The resulting carbon nanotubes typically exhibit armchair chirality and typically have metallic properties. The carbon nanotubes produced by this method readily form bulk materials, which typically have a conductivity of at least $0.7 \times 10^6$ Sm$^{-1}$ in at least one direction. The invention has particular application to the manufacture of components such as electrical conductors. Suitable electrical conductors include wires (e.g. for electrical motors) and cables (e.g. for transmitting electrical power).

3 Claims, 12 Drawing Sheets

(51) Int. Cl.
  B01J 23/745    (2006.01)
  B01J 35/00     (2006.01)
  B01J 37/08     (2006.01)
  B82Y 30/00     (2011.01)
  B82Y 40/00     (2011.01)
  D01F 9/127     (2006.01)
  D01F 9/133     (2006.01)
  D01F 11/14     (2006.01)
  C01B 32/16     (2017.01)
  C01B 32/162    (2017.01)
(52) U.S. Cl.
  CPC ............ *B01J 37/086* (2013.01); *B82Y 30/00* (2013.01); *B82Y 40/00* (2013.01); *C01B 32/16* (2017.08); *C01B 32/162* (2017.08); *D01F 9/127* (2013.01); *D01F 9/1272* (2013.01); *D01F 9/133* (2013.01); *D01F 11/14* (2013.01); *C01B 2202/22* (2013.01); *C01B 2202/30* (2013.01); *C01B 2202/36* (2013.01); *Y10T 428/268* (2015.01); *Y10T 428/2927* (2015.01); *Y10T 428/2982* (2015.01)
(58) Field of Classification Search
  USPC ............... 428/408; 423/447.1, 448; 977/742
  See application file for complete search history.

(56) References Cited

U.S. PATENT DOCUMENTS

2006/0029537 A1   2/2006   Zhang
2007/0264187 A1  11/2007   Harutyunyan
2011/0024409 A1*  2/2011   Shah ................ B64D 15/12
                                                  219/482

FOREIGN PATENT DOCUMENTS

WO   WO 2007/024242   3/2007
WO   WO 2008/132467  11/2008
WO   WO 2009/055831   4/2009
WO   WO 2009/110591   9/2009
WO   WO 2010/014650   2/2010
WO   WO 2010/091704   8/2010

OTHER PUBLICATIONS

Bhowmick et al., 2008 Carbon 46:907-922, "Parametric analysis of chirality families and diameter distribution in single-wall carbon nanotube production by the floating catalyst method".

Cheng et al., 1998 Chemical Physics Letters 289:602-610, "Bulk morphology and diameter distribution of single-walled carbon nanotubes synthesized by catalytic decomposition of hydrocarbons".

Dresselhaus et al., 2005 Physics Reports 409:47-99, "Raman spectroscopy of carbon nanotubes".

Ericson et al., 2004 Science 305:1447-1450, "Macroscopic, Neat, Single-Walled Carbon Nanotube Fibers".

Harutyunyan et al., 2009 Science 326:116, Supporting Online Material for "Preferential Growth of Single-Walled Carbon Nanotubes with Metallic Conductivity".

International Search Report and Written Opinion dated Mar. 2, 2011 for International Application No. PCT/GB2011/001549.

Jorio, Dresselhaus and Dresselhaus 2008 Springer Veriag Heidelberg, pp. 103-106, 116-123, "Carbon Nanotubes".

Kataura et al., 1999 Synthetic Metals 103:2555-2558, "Optical Properties of Single-Wall Carbon Nanotubes".

Kozio et al., 2007 Science 318:1892-1895, "High-Performance Carbon Nanotube Fiber".

Motta et al., 2008 Journal of Nanoscience and Nanotechnology 8:1-8, "The Role of Sulphur in the Synthesis of Carbon Nanotubes by Chemical Vapour Deposition at High Temperatures".

Nasilbulin et al., 2005 Carbon 43:2251-2257, "Correlation between catalyst particle and single-walled carbon nanotube diameters".

UKIPO search report dated Mar. 10, 2011 for corresponding Application No. GB 1018498.4.

UKIPO search report dated Jul. 7, 2011 for corresponding Application No. GB 1018498.4.

Sundaram et al., 2011 Advanced Materials 23(43):5064-5068, "Continuous Direct Spinning of Fibers of Single-Walled Carbon Nanotubes with Metallic Chirality" and supplementary supporting information.

Sundaram et al., 2010 Abstract Only "Morphology control of continuously spun carbon nanotube fibres".

Ya-Li Li et al., 2004 Science 304:276-278, "Direct Spinning of Carbon Nanotube Fibers from Chemical Vapor Deposition Synthesis".

Zhou et al., 2004 Journal of Applied Physics 95(2):649-655, "Single wall carbon nanotube fibers extruded from super-acid suspensions: Preferred orientation, electrical, and thermal transport".

* cited by examiner

CARBON MATERIALS COMPRISING CARBON NANOTUBES AND METHODS OF MAKING CARBON NANOTUBES

RELATED APPLICATIONS

This application is a 35 U.S.C. § 371 national phase application of PCT/GB2011/001549 (WO2012/059716), filed on Nov. 2, 2011 entitled "Carbon Materials Comprising Carbon Nanotubes and Methods of Making Carbon Nanotubes", which application claims the benefit of Great Britain Application Serial No. 1018498.4, filed Nov. 2, 2010, each of which are incorporated herein by reference in their entirety.

BACKGROUND TO THE INVENTION

Field of the Invention

The present invention relates to carbon materials comprising carbon nanotubes, powders comprising carbon nanotubes, and methods of making carbon nanotubes. The present invention has particular, but not exclusive, application to the manufacture of components such as electrical conductors. Suitable electrical conductors include wires (e.g. for electrical motors) and cables (e.g. for transmitting electrical power).

Related Art

Carbon nanotubes are allotropes of carbon, which are tubular and typically have a diameter in the nanometre range. The carbon atoms of a carbon nanotube are each covalently bonded to three other carbon atoms, to create a "hexagonal" lattice which forms a wall of the tube. Accordingly, a carbon nanotube can be thought of as a "rolled" graphene sheet. Single-walled carbon nanotubes have a single layer of carbon atoms. Double- and multi-walled carbon nanotubes have two or more layers of carbon atoms, respectively.

The chirality of carbon nanotubes can vary, depending on the orientation of the hexagonal lattice of the notional graphene sheet with respect to the tube axis. Carbon nanotube chirality will be well understood by a person skilled in the art. For example, carbon nanotubes may have armchair chirality or zigzag chirality. Carbon nanotubes with a chirality intermediate an armchair and a zigzag chirality are generally referred to as chiral carbon nanotubes.

Without wishing to be bound by theory, it is believed that all single-walled armchair carbon nanotubes are electrically conductive, regardless of their diameter (i.e. it is believed that all single-walled armchair carbon nanotubes are metallic). Zigzag and chiral carbon nanotubes may be metallic or semiconducting.

(Nanotube chirality and properties, such as metallic and semiconducting properties, are explained in detail in Reference 4, which is incorporated herein by reference in its entirety.)

Production of bulk carbon nanotube materials is of particular interest. Such carbon nanotube materials can have particularly beneficial properties, such as relatively low density and high strength.

WO2008/132467 describes densifying carbon nanotubes to improve the efficiency of carbon nanotube packing, in order to provide a fibre or film. For example, a density enhancement agent such as divinyl benzene may be applied to the carbon nanotubes, in order to improve the packing of the carbon nanotubes, which provides a higher strength material. The fibres and films described in WO2008/132467 may be at least one metre long.

Similarly, Koziol et al[1] have described the production of carbon nanotube fibres with high specific strength and high specific stiffness. This document describes the production of carbon nanotubes by thermal chemical vapour deposition (CVD). In the methods described, the resulting "aerogel" of carbon nanotubes is drawn into a fibre, which is run through an acetone vapour stream to enhance the densification. A winding rate of up to 20 m min$^{-1}$ is employed to draw the fibre.

Motta et al[2] have described the effect of sulphur as a promoter of carbon nanotube formation. They describe using thiophene as a sulphur precursor in iron catalysed thermal CVD, to produce nanotubes with a diameter of between 4 nm and 10 nm, which were typically double-walled. The iron catalyst particles were about 5 nm to 10 nm. The resulting aerogel was drawn into a fibre, with a winding rate of 20 m min$^{-1}$. Motta et al report a high carbon nanotube growth rate of up to 0.1 to 1 mm sec$^{-1}$.

The carbon materials produced by the methods described in these documents include a mixture of carbon nanotubes with a wide distribution of diameters and with a wide distribution of chiralities (including armchair, zigzag and intermediate chiralities). Increasing the degree of control of carbon nanotube formation would provide a greater control of the properties of the resulting carbon materials produced, but although many researchers have made efforts to provide such control, the present inventors are not aware of any disclosure of significant recent progress in this area.

SUMMARY OF THE INVENTION

The present inventors have devised the present invention in order to address one or more of the above problems.

The present inventors have realised that by ensuring close control of the size of catalyst particles in gas phase formation of carbon nanotubes, for example in chemical vapour deposition (CVD), it is possible to control the diameter of the carbon nanotubes produced. The resulting carbon nanotubes typically exhibit armchair chirality and typically have metallic properties. The carbon nanotubes produced in this method readily form bulk materials, for example by the densification methods described by Koziol et al[1].

Thus, the present inventors have for the first time demonstrated that it is possible to produce an electrically conductive carbon material in bulk form, which includes a narrow size range of small diameter carbon nanotubes.

Accordingly, in a first preferred aspect, the present invention provides a carbon material comprising carbon nanotubes, wherein at least 70% by number of the carbon nanotubes have a diameter in the range from 1 nm to 2.5 nm.

The term "material" here is intended to mean a substance that has the form of a solid and has independent existence, in the sense that it has no requirement to be supported by a substrate. Thus, the material can be self-supporting (or, more generally, capable of being self-supporting). However, the materials of the invention may cooperate with other materials (such as substrates) in order to provide the materials with additional functionality.

The carbon material is preferably provided in the form of at least one fibre. The fibre typically comprises a very large number of carbon nanotubes. The carbon material preferably has a conductivity of at least $0.7 \times 10^6$ Sm$^{-1}$ in at least one direction (at room temperature). Preferably, the carbon material comprises at least 75% by weight of carbon nanotubes. The carbon material may be, for example, a fibre or a film. It may have at least one dimension greater than 0.5 m.

In a second preferred aspect, the present invention provides a method of producing carbon nanotubes, the method comprising:

providing a plurality of floating catalyst particles, wherein at least 70% by number of the catalyst particles have a diameter less than or equal to 4.5 nm; and contacting the floating catalyst particles with a gas phase carbon source to produce carbon nanotubes.

The significance of contacting floating catalyst particles with the gas phase carbon source is that, at least during the formation of the carbon nanotubes, the catalyst particles are not supported on a substrate but instead are held (e.g. suspended) within a gas.

Preferably, the step of providing a plurality of catalyst particles comprises initiating growth of catalyst particles and subsequently arresting the growth of the catalyst particles using an arresting agent. The steps of initiating growth of catalyst particles and subsequently arresting their growth is preferably carried out in the gas phase.

In another preferred aspect, the present invention provides a method of producing carbon nanotubes, the method comprising:

providing a plurality of floating catalyst particles; and contacting the floating catalyst particles with a gas phase carbon source to produce carbon nanotubes wherein the floating catalyst particles are provided by:

initiating growth of the catalyst particles by thermal degradation of a catalyst source substance, the thermal degradation of the catalyst source substance beginning at a first onset temperature, and subsequently arresting the growth of the catalyst particles using an arresting agent, the arresting agent being provided to the catalyst particles by thermal degradation of an arresting agent source substance, the thermal degradation of the arresting agent source substance beginning at a second onset temperature, wherein the second onset temperature is in the range of temperatures from 10° C. more than the first onset temperature to 350° C. more than the first onset temperature.

Further preferred temperature ranges are set out below.

WO2010/014650 reports the preparation of metallic single-wall carbon nanotubes. This document describes dispersing Fe-containing catalyst particles on a substrate, then treating the catalyst particles to obtain the desired catalyst particle size, for example an average particle diameter ranging from 0.2 nm to 5 nm, or from about 0.9 nm to 1.4 nm. The catalyst particles, which are immobilised on the substrate, are then contacted with a gaseous carbon source, to produce carbon nanotubes which are correspondingly immobilised on the substrate. This document reports the production of predominantly metallic single wall nanotubes, under certain reaction conditions. However, the formation of carbon nanotubes on a substrate does not provide a route for the production of a carbon nanotube material, such as an electrically conductive material. A similar method is described by Harutyunyan et al[3].

Gas phase production of carbon nanotubes typically results in a low density mass of carbon nanotubes. A typical density of this mass of carbon nanotubes is less than $10^{-1}$ g cm$^{-3}$, or less than $10^{-2}$ g cm$^{-3}$.

In the literature, such a mass of carbon nanotubes is sometimes referred to as an "aerogel", although the use of this term is not systematically applied. Such a mass of carbon nanotubes can be densified to provide a carbon material, such as a fibre or film. However, alternatively, the mass of carbon nanotubes may be crushed, chopped, cut or otherwise processed to form a powder. It will be understood that the powder may not exhibit significant electrical conductivity.

Accordingly, in a third preferred aspect, the present invention provides a carbon powder comprising carbon nanotubes, wherein at least 70% by number of the carbon nanotubes have a diameter in the range from 1 nm to 2.5 nm.

Preferably, the carbon powder is provided in an amount of at least 10 g.

In a further preferred aspect, the present invention provides a carbon material or a carbon nanotube powder obtained or obtainable by the method of the second preferred aspect. It will be understood that the carbon materials and the carbon powders described herein may be obtained or obtainable by the methods of making carbon nanotubes described herein.

In a further preferred aspect, the present invention provides a current carrying component comprising a carbon material according to the first preferred aspect.

In a further preferred aspect, the present invention provides a current carrying component consisting of: carbon nanotubes; optionally, remaining catalyst particles; and incidental impurities, wherein at least 70% by number of the carbon nanotubes have a diameter in the range from 1 nm to 2.5 nm.

The current carrying component preferably has a length of at least 0.5 m, more preferably (for some embodiments) at least 1 m, at least 10 m or at least 100 m. The current carrying component may, for example, be provided in the form of an electrical cable, an electrical interconnect or an electrical wire. The diameter of the current carrying component is not particularly limited in the present invention, but will typically be determined by the application to which the component will be put, taking into account the required current carrying capacity for that application. The current carrying component is preferably to be used at or near ambient temperature.

The current carrying component may be used in a range of electrical applications. The current carrying component may be used in a power transmission cable. The current carrying component may be used in a lightning protection system. Alternatively, the current carrying component may be used in general electrical wiring applications, e.g. to replace conventional copper wiring. In a preferred embodiment, the current carrying component may be used as the current-carrying windings of an electromagnet, for example in a solenoid or more preferably in an electric motor. The combination of properties of the preferred current carrying components (high current density, high strength, low density) are particularly well suited to the manufacture of small size and/or low weight electric motors.

In a further preferred aspect, the present invention comprises a woven or non-woven fabric, comprising a carbon material according to the first preferred aspect.

In a further preferred aspect, the present invention provides a woven or non-woven fabric consisting of: carbon nanotubes; optionally, remaining catalyst particles; and incidental impurities, wherein at least 70% by number of the carbon nanotubes have a diameter in the range from 1 nm to 2.5 nm.

The woven or non-woven fabric may comprise a plurality of fibres, each fibre being formed of a large number of carbon nanotubes.

The woven or non-woven fabric may be used in clothing. For example, the clothing may include sensors, for monitoring the condition of the wearer. The sensors may be arranged to transmit information from the sensors to a remote receiver, providing for remote monitoring of the condition of the wearer, for example remote monitoring of the health of the wearer. For example, the clothing may provide for remote monitoring of the temperature of the wearer. The clothing may be worn, for example, by a patient or by a soldier. It will be understood that the electrically conductive fibres of the woven or non-woven fabric may form part of the sensor and information transmission system.

Further preferred or optional features of the above aspects will now be set out. Any aspect of the invention may be combined with any other aspect, unless the context demands otherwise. Any of the preferred or optional features of any aspect may be combined, either singly or in combination, with any aspect of the invention, unless the context demands otherwise. Where a series of end points for a particular range is given, it is to be understood that any one of those end points can be applied independently to the invention.

The carbon material of the present invention is electrically conductive. Preferably, it has a conductivity of at least $0.7 \times 10^6$ S m$^{-1}$ in at least one direction (at room temperature). More preferably, it has a conductivity of at least 0.8, 0.9, 1.0, 1.1, 1.2, 1.3, 1.4, 1.5, 1.6, 1.7, 1.8, 1.9, or $2.0 \times 10^6$ S m$^{-1}$ in at least one direction (at room temperature). It is preferred that the carbon nanotubes dominate the electrical properties of the material, thus providing the material with its electrical conductivity.

Preferably, at least at room temperature, the carbon material has a positive coefficient of resistivity with increasing temperature.

The carbon material may have a current density of at least 15 A mm$^{-2}$, more preferably at least 20, at least 25, at least 30, at least 35, at least 40, at least 50, at least 60 or at least 70 A mm$^{-2}$. As used herein, the term "current density" refers to the amount of current density which can be carried by the carbon material without requiring force cooling to avoid runaway heating.

The carbon material may preferably be a fibre or a film. Where the carbon material is a fibre, the carbon nanotubes may have their principal axes substantially aligned with the length direction of the fibre. Similarly, where the carbon material is a film, the principal axes of the carbon nanotubes may be substantially aligned with each other and may lie substantially in the plane of the film. The carbon material may comprise bundles of carbon nanotubes, in which bundles the principal axes of the carbon nanotubes may be substantially aligned with each other.

The carbon material may be a yarn, comprising bundles of fibres (which fibres may comprise bundles of carbon nanotubes). It will be understood that the yarn may consist of bundles of fibres, optionally remaining catalyst particles, and incidental impurities.

The carbon material preferably has at least one dimension greater than 0.5 m. The carbon material may have at least one dimension greater than 1 m, 2 m, 5 m, 10 m, 15 m or 20 m.

Where the carbon material is a fibre or a yarn, said at least one dimension may be the length of the fibre. Where the carbon material is a fibre, typically the fibre has a diameter in the range from 1 μm to 10 cm. More preferably, the fibre has a diameter in the range from 1 μm to 1 mm, or from 1 μm to 100 μm, or from 1 μm to 50 μm. A typical fibre diameter is 10 μm.

Where the carbon material is a film, said at least one direction may be the length of the film. The film may have a thickness of at least 10 nm, for example at least 20 nm, at least 30 nm or at least 40 nm. The film may have a thickness of 1 mm or less, more preferably 500 μm or less, 250 μm or less, 100 μm or less, 1 μm or less, or 100 nm or less. A typical thickness is 50 nm. It will be understood that two or more films may be placed on top of each other e.g. to provide a plurality of overlying layers, which may together have a thickness greater than those set out above.

A particular advantage of the carbon material of the present invention is that it may provide a relatively high electrical conductivity while having relatively low density, compared for example with metals and alloys typically employed as electrical current carrying components. Typically, the carbon material has a density of 0.1 g cm$^{-3}$ or more. It may have a density of at least 0.2, 0.3, 0.4, 0.5, 0.6, 0.7 or 0.8 g cm$^{-3}$ or more. Preferably, the carbon material has a density of 2.0 g cm$^{-3}$ or less, such as a density of 1.5, 1.4, 1.3, 1.2 or 1.1 g cm$^{-3}$ or less. In contrast, aluminium typically has a density of 2.7 g cm$^{-3}$, and copper typically has a density of 8.9 g cm$^{-3}$.

Where the carbon material is a fibre, its linear density may instead be considered. For example, it may have a linear density which is 1 g km$^{-1}$ or less, for example 0.5, 0.4, 0.3, 0.2, 0.1 or 0.05 g km$^{-1}$ or less. Such a low linear density may be suitable for some specific applications. However, it is to be understood that other specific applications (e.g. electrical power cabling applications) will require a much higher linear density.

Another advantage of the carbon materials of the present invention is that they may provide a relatively high electrical conductivity combined with a relatively high strength. The carbon material preferably has a specific strength of at least 0.1 GPa SG$^{-1}$ in at least one direction, such as at least 0.2, 0.3, 0.4, 0.5, 0.6, 0.7 or 0.8 GPa SG$^{-1}$. In contrast, aluminium typically has a specific strength of 0.026 GPa SG$^{-1}$, and copper typically has a specific strength of 0.025 GPa SG$^{-1}$.

(As used herein, specific strength is the ultimate tensile strength (UTS, measured in GPa) of the material concerned, divided by its specific gravity (SG). Specific gravity is a dimensionless value, obtained by dividing the density of the substance in question by the density of a reference substance, in this case water. The calculation of specific strength is explained in detail Reference 1, which is incorporated herein by reference in its entirety.)

Similarly, the specific stiffness of the carbon materials of the present invention is relatively high. The carbon material preferably has a specific stiffness of 30 GPa SG$^{-1}$ or more, more preferably 40 or 50 GPa SG$^{-1}$ or more. In contrast, aluminium typically has a specific stiffness of 26 GPa SG$^{-1}$, and copper typically has a specific stiffness of 13 GPa SG$^{-1}$. (Here, stiffness is the elastic modulus of the material, and specific stiffness is determined by dividing this value by the specific gravity of the material. The calculation of specific stiffness is explained in detail Reference 1, which is incorporated herein by reference in its entirety.)

Preferably, the carbon material or the carbon nanotube powder comprises at least 75% by weight of carbon nanotubes. It may comprise at least 80%, 85%, 90%, 95%, 96%, 97%, 98% or 99% by weight of carbon nanotubes.

It will be understood that the carbon material of the present invention, and the carbon nanotube powder of the present invention, may comprise other components. For example, residual catalyst particles employed in the synthesis of the carbon nanotubes may remain in the carbon material. Accordingly, the carbon material of the present invention, and the carbon nanotube powder of the present invention, may comprise a plurality of catalyst particles dispersed in the material. Preferably, the material or powder comprises 20% by weight or less of catalyst particles, for example 15%, 10%, 5%, 4%, 3%, 2% or 1% by weight or less of catalyst particles.

The catalyst particles may have any of the features described below in relation to the catalyst particles employed in the methods of the present invention. For example, the catalyst particles may comprise transition metal atoms, such as iron, cobalt and/or nickel atoms. The catalyst particles may comprise sulphur atoms. In a particularly preferred embodiment, the catalyst particles may comprise an inner core of transition metal atoms surrounded by a shell or cage of sulphur atoms.

At least 70% by number of the catalyst particles may preferably have a diameter less than or equal to 4.5 nm, or less than or equal to 3.5 nm. For example, at least 70% of the catalyst particles may have a diameter in the range from 0.5 nm to 4.5 nm, more preferably from 0.5 nm to 3.5 nm, or from 1.5 nm to 3.5 nm. More preferably, at least 75%, 80%, 85%, 90%, 95%, 96%, 97%, 98% or 99% by number of the catalyst particles have a diameter less than or equal to 4.5 nm, or less than or equal to 3.5 nm. It will be understood that at least 75%, 80%, 85%, 90%, 95%, 96%, 97%, 98% or 99% by number of the catalyst particles may have a diameter in the range from 0.5 nm to 4.5 nm, more preferably from 0.5 nm to 3.5 nm, or from 1.5 nm to 3.5 nm. The number and size of catalyst particles may be determined by transmission electron microscopy (TEM), as described in more detail below with reference to the methods of the present invention.

The carbon material may, for example, consist of a plurality of carbon nanotubes, optionally a plurality of catalyst particles dispersed in the material, and incidental impurities. Similarly, the carbon nanotube powder may consist of a plurality of carbon nanotubes, optionally a plurality of catalyst particles in the powder, and incidental impurities.

As described above, the methods of the present invention can provide a high degree of control of carbon nanotube diameter, chirality and metallic properties. Typically, the methods result in the production of a population of carbon nanotubes having a high proportion of metallic carbon nanotubes. Typically, the methods result in the production of a population of carbon nanotubes having a high proportion of armchair carbon nanotubes.

Accordingly, the present inventors have made available for the first time carbon materials comprising a high proportion of metallic carbon nanotubes. Accordingly, it will be understood that the carbon materials of the present invention, and the carbon nanotube powders, typically comprise a high proportion of metallic carbon nanotubes. For example, substantially all of the carbon nanotubes may be metallic.

Similarly, the present inventors have made available for the first time carbon materials comprising a high proportion of armchair carbon nanotubes. Accordingly, it will be understood that the carbon materials of the present invention, and the carbon nanotube powders, typically comprise a high proportion of armchair carbon nanotubes. For example, substantially all of the carbon nanotubes may have armchair chirality.

The person skilled in the art will be familiar with methods for probing the metallic or semiconducting properties of carbon nanotubes. One suitable method for probing the metallic or semiconducting properties of carbon nanotubes, for example in a carbon material or carbon nanotube powder, employs Raman spectroscopy.

One vibrational mode of carbon nanotubes is the radial breathing mode. This radial breathing mode can be probed using Raman spectroscopy. For a given wavelength of incident light, only radial breathing modes of carbon nanotubes with certain diameters will be resonant, and so only certain diameters of carbon nanotubes will give rise to radial breathing mode (RBM) peaks in the Raman spectrum. The wavenumber of a given RBM peak can be used to determine the diameter of the carbon nanotube which gave rise to that peak, using the equation $d=239/\omega_{RBM}$, wherein d is the nanotube diameter in nm, and $\omega_{RBM}$ is the wavenumber of the radial breathing mode peak in $cm^{-1}$.

Once the diameter of the carbon nanotube(s) giving rise to the RBM peak has been determined, it is possible to determine whether those carbon nanotube(s) are metallic or semiconducting. This is done using a plot called a Kataura plot, such as the plot shown in FIG. 1. The diameter of the carbon nanotube is read from the x-axis, and the excitation energy used to generate the RBM peak in question is read from the y-axis. For a given diameter and excitation energy, the plot indicates whether the carbon nanotube(s) giving rise to the RBM peak are metallic or semiconducting.

For example, a typical method of probing the metallic or semiconducting properties of carbon nanotubes in a carbon material or powder comprises the steps of:
(i) taking a first Raman spectrum using an incident wavelength of 633 nm;
(ii) identifying each peak falling in the range from 120 $cm^{-1}$ to 350 $cm^{-1}$ (RBM peaks);
(iii) determining the position ($\omega_{RBM}$) of each RBM peak using Lorentzian fit;
(iv) determining the nanotube diameter associated with each RBM peak, using the equation $$d=239/\omega_{RBM}$$

wherein d is the nanotube diameter in nm, and $\omega_{RBM}$ is the frequency of the radial breathing mode peak in $cm^{-1}$;
(v) comparing this diameter with the Katura plot shown in FIG. 1, using an excitation energy of 1.96+/−0.1 eV (which corresponds to the 633 nm incident light) to determine whether each RBM peak corresponds to metallic or semiconducting carbon nanotubes;
(vi) taking a second Raman spectrum using an incident wavelength of 514 nm, corresponding to an excitation energy of 2.41+/−0.1 eV, and repeating steps (ii) to (v) for this second Raman spectrum.

In FIG. 1, the filled circles indicate semiconducting nanotubes, and the open circles indicate metallic nanotubes.

When the above method is carried out on the carbon material or carbon nanotube powder of the present invention, preferably at least one of the first and second Raman spectra includes at least one RBM peak which corresponds to metallic carbon nanotubes. Preferably, neither of the first and second Raman spectra includes any RBM peak which corresponds to semiconducting carbon nanotubes.

In the above method for probing the metallic or semiconducting properties of carbon nanotubes, the sample probed may be a bulk carbon material. In that case, preferably the method is carried out a plurality of times, on different regions of the sample. For example, preferably at least 10 regions are probed. Preferably, at least 70%, 80% or 90% of the probed regions meet one or more of the conditions recited above. In the case of a fibre, the incident light may be aligned with the fibre axis. The regions probed may be equally spaced, e.g. at a spacing distance of 1 cm along the fibre axis.

Alternatively, the carbon nanotubes of the carbon material may be dispersed before the method for probing the metallic or semiconducting properties of carbon nanotubes is carried out. In this case, the method may be carried out on a single sample of dispersed carbon nanotubes. Alternatively, the method may be repeated for one or more samples of dispersed carbon nanotubes, for example 10 samples. Preferably, at least 70%, 80% or 90% of the probed samples meet one or more of the conditions recited above.

In the case of a carbon nanotube powder, the method of probing the metallic or semiconducting properties of carbon nanotubes can be carried out on one or more, e.g. 10 samples. Preferably, at least 70%, 80% or 90% of the probed samples meet one or more of the conditions recited above.

A suitable laser source for the 633 nm incident light is He/Ne. A suitable laser source for the 514 nm incident light is Ar ion. The range of wavenumbers scanned for each spectrum may be at least 100 cm$^{-1}$ to 400 cm$^{-1}$, e.g. 50 cm$^{-1}$ to 3300 cm$^{-1}$. A suitable spectroscope is the Renishaw Ramanscope 1000 system, available from Renishaw (www.renishaw.com). A suitable laser spot size is 1 μm$^2$. A suitable acquisition time is 10 s.

The Raman spectroscopy methods described above are particularly suited to probing single-walled carbon nanotubes. It is preferable that the carbon material, or the carbon nanotube powder, comprises single-walled carbon nanotubes. Preferably, at least 50% by number of the carbon nanotubes are single-walled carbon nanotubes. More preferably, at least 60%, 70%, 80%, 90%, 95%, 96%, 97%, 98% or 99% by number of the carbon nanotubes are single-walled carbon nanotubes.

Methods of probing the properties of carbon nanotubes using Raman spectroscopy are described in Reference 4 and Reference 5, which are each incorporated herein by reference in their entirety.

As explained above, the carbon materials of the present invention, and the carbon nanotube powders, typically comprise a high proportion of armchair carbon nanotubes. For example, substantially all of the carbon nanotubes may have armchair chirality.

The chirality of a single carbon nanotube, of a bundle of carbon nanotubes or, more generally, of a population of carbon nanotubes (e.g. in a carbon material or carbon nanotube powder) can be probed using electron diffraction. As the skilled person understands, TEM analysis allows the production of electron diffraction patterns by suitable operation of the microscope. The electron beam is directed through the carbon nanotube (or bundle of carbon nanotubes) in a direction perpendicular to the principal axis of the carbon nanotube. The resultant electron diffraction pattern indicates the chirality of the carbon nanotube.

For both zigzag and armchair single-walled nanotubes, a hexagonal pattern of six diffraction spots is generated. However, the orientation of these spots with respect to the principal axis of the nanotube is different for zigzag and for armchair nanotubes. For armchair nanotubes, three of the six spots are positioned to one side of the principal axis of the nanotube, and three are positioned to the other side of the principal axis. In contrast, for zigzag carbon nanotubes, two of the six spots are positioned to one side of the principal axis, two are positioned to the other side of the principal axis, and two spots are aligned with the principal axis.

This is illustrated in FIG. 2. FIG. 2A shows a schematic representation of the diffraction pattern generated by an armchair carbon nanotube, and FIG. 2B shows a schematic representation of the diffraction pattern generated by a zigzag carbon nanotube. The "x" points indicate the position of the diffraction spots. The solid vertical lines illustrate the principal axis direction of the carbon nanotube.

Where a population (e.g. a bundle) of carbon nanotubes having the same chirality is probed, similar results are observed. Where a mixture of different chiralities is present, the diffraction spots generated by carbon nanotubes of different chiralities together form a circular pattern of diffraction spots. In some cases, these spots may merge to form a continuous circular diffraction pattern. Similarly, in multi-walled carbon nanotubes, typically a circular diffraction pattern is generated, indicating a mixture of chiralities.

In all cases, the spots tend to be slightly elongated streaks, elongated in a direction substantially perpendicular to the principal axis of the nanotube, in the plane of the diffraction pattern.

Preferably, at least 50% by number of the carbon nanotubes are single-walled armchair carbon nanotubes. More preferably, at least 60%, 70%, 80%, 90%, 95%, 96%, 97%, 98% or 99% by number of the carbon nanotubes are single-walled armchair carbon nanotubes.

The percentage by number of single-walled carbon nanotubes having armchair chirality can be determined using electron diffraction, as described above. 50% by number of the carbon nanotubes are considered to be armchair single-walled carbon nanotubes wherein when at least 10 separate regions of the material are probed by electron diffraction (e.g. 10 different carbon nanotubes (not in the same bundle), or 10 different bundles of carbon nanotubes) using a beam perpendicular to the principal axis of the carbon nanotube, at least 50% of the probed nanotubes or bundles give rise to an armchair diffraction pattern. An armchair diffraction pattern is considered to be a hexagonal pattern of six diffraction spots, where three of the six spots are positioned to one side of the principal axis of the carbon nanotube, and three are positioned, substantially mirror symmetrically, to the other side of the principal axis of the carbon nanotube.

More preferably, an armchair diffraction pattern may be considered to be a hexagonal pattern of six diffraction spots, where the spots are located at positions 30°, 90°, 150°, 210°, 270° and 330°+/−5° (or +/−4°, 3°, 2° or 1°) with respect to the principal axis of the carbon nanotube. Here, the positional angle is measured between the principal axis of the carbon nanotube and a line extending from the centre of the beam (central spot) to the centre of the diffraction spot.

Where a bundle of nanotubes is probed, the nanotubes should preferably have their principal axes aligned. Conveniently, where the carbon material is a fibre, the fibre axis may be taken to be the principal axis of the carbon nanotubes, although this can of course be easily confirmed during the TEM analysis.

(It will be understood that the principal axis of a carbon nanotube extends along the elongation direction of the carbon nanotube.)

Suitable armchair chiralities for the carbon nanotubes of the material and powder of the present invention include the following. The chiralities are given in terms of n and m (m, m) and are listed alongside their diameter:

(3,3) 0.41±0.02 nm
(4,4) 0.54±0.02 nm
(5,5) 0.68±0.02 nm
(6,6) 0.81±0.02 nm
(7,7) 0.95±0.02 nm
(8,8) 1.10±0.02 nm
(9,9) 1.22±0.02 nm
(10,10) 1.36±0.02 nm
(11,11) 1.49±0.02 nm
(12,12) 1.63+0.02 nm
(13,13) 1.76±0.02 nm
(14,14) 1.90±0.02 nm (15,15) 2.03±0.02 nm
(16,16) 2.17±0.02 nm
(17,17) 2.31±0.02 nm
(18,18) 2.44±0.02 nm
(19,19) 2.58±0.02 nm
(20,20) 2.71±0.02 nm
(21,21) 2.85±0.02 nm
(22,22) 2.98±0.02 nm

The (m, m) notation employed here will be familiar to the person skilled in the art.

In the carbon materials and carbon nanotube powder of the present invention, preferably at least 70% by number of the carbon nanotubes have a diameter in the range from 1 nm to 2.5 nm, more preferably from 1 nm to 2 nm. More preferably, at least 75%, 80%, 85%, 90%, 95%, 96%, 97%, 98% or 99% by number of the carbon nanotubes have a diameter in the range from 1 nm to 2.5 nm, more preferably from 1 nm to 2 nm. The diameter of carbon nanotubes in a material can be determined by TEM. The size distribution of the carbon nanotubes can be determined by counting. For example, TEM may be carried out on 2, 5, 10 or more samples of the carbon material or carbon nanotube powder to determine the size distribution.

As set out above, in at least one aspect, the present invention provides a method of producing carbon nanotubes, the method comprising:
    providing a plurality of floating catalyst particles, wherein at least 70% by number of the catalyst particles have a diameter less than or equal to 4.5 nm; and
    contacting the floating catalyst particles with a gas phase carbon source to produce carbon nanotubes.

The method typically yields a mass of carbon nanotubes, having a density of $10^{-2}$ g cm$^{-3}$ or less, for example $10^{-3}$ g cm$^{-3}$ or less. Typically, the mass of carbon nanotubes has a density of $10^{-6}$ g cm$^{-3}$ or more. In the literature, this mass of carbon nanotubes is sometimes referred to as an aerogel.

At least 70% by number of the catalyst particles have a diameter which is less than or equal to 4.5 nm, or less than or equal to 3.5 nm. For example, at least 70% by number of the catalyst particles have a diameter in the range from 0.5 nm to 4.5 nm, more preferably from 0.5 nm to 3.5 nm or from 1.5 nm to 3.5 nm. More preferably, at least 75%, 80%, 85%, 90%, 95%, 96%, 97%, 98% or 99% by number of the catalyst particles have a diameter less than or equal to 4.5 nm or less than or equal to 3.5 nm. It will be understood that at least 75%, 80%, 85%, 90%, 95%, 96%, 97%, 98% or 99% by number of the catalyst particles may have a diameter in the range from 0.5 nm to 4.5 nm, more preferably from 0.5 nm to 3.5 nm or from 1.5 nm to 3.5 nm.

The diameter of the catalyst particles can be determined by TEM. The diameter of a catalyst particle is taken to be the largest linear dimension of that particle visible on the TEM image. Typically, the product of the process for forming the carbon nanotubes includes not only the carbon nanotubes but also residual catalyst particles, typically randomly dispersed amongst the population of carbon nanotubes. Accordingly, the TEM can be carried out on a sample of carbon nanotubes produced by the process, and thus the size distribution of catalyst particles determined. Alternatively, catalyst particles can be isolated during the process, after their formation but before carbon nanotube production. TEM can be carried out on the isolated catalyst particles to determine their diameter.

The present inventors have realised that the size of the catalyst particles can be conveniently controlled by initiating growth of catalyst particles and subsequently arresting the growth of the catalyst particles using an arresting agent. This may be carried out in the gas phase.

The growth of catalyst particles may be initiated by degradation of a catalyst source substance (e.g. a catalyst source compound or element), and/or the arresting agent may be supplied by degradation of an arresting agent source substance (e.g. an arresting agent source compound or element). Typically, this may be performed by:
    subjecting a mixture of catalyst source substance and arresting agent source substance to catalyst source substance degradation conditions;
    and subsequently subjecting said mixture to arresting agent source substance degradation conditions.

It will be understood that the term "degradation" as used herein includes chemical breakdown of a compound to release e.g. its component atoms or a simpler compound. It will be understood that the term "degradation" as used herein also includes physical change in a substance which results in the release of a catalyst component such as a transition metal atom (to allow catalyst particle growth), or release of arresting agent (to arrest catalyst particle growth). For example, the physical change could be vaporisation or sublimation. The term "degradation conditions" should be interpreted accordingly.

Typically, degradation of the catalyst source substance (e.g. compound) may be by thermal degradation. Typically, the degradation of arresting agent source substance (e.g. compound) may be by thermal degradation. This is desirable in embodiments where the carbon nanotubes are produced by thermal chemical vapour deposition (thermal CVD). However, it is noted here that other manufacturing conditions may be used, e.g. plasma CVD.

Thermal degradation of the catalyst source substance may begin at a first onset temperature, and thermal degradation of the arresting agent source substance may begin at a second onset temperature. Preferably, the second onset temperature is greater than the first onset temperature. Preferably, the second onset temperature is not more than 350° C. greater than the first onset temperature, for example not more than 300° C., 250° C., 200° C., 150° C., 100° C., 90° C., 80° C., 70° C., 60° C. or 50° C. greater than the first onset temperature. Preferably, the second onset temperature is at least 10° C. greater than the first onset temperature, for example at least 20° C., 30° C., 40° C., 50° C., 60° C., 70° C., 80° C., 90° C. or 100° C. greater than the first onset temperature.

The first onset temperature may be at least 200° C., or at least 300° C. The first onset temperature may be 700° C. or less, more preferably 600° C. or less, 500° C. or less, or 400° C. or less. The second onset temperature may be at least 300° C., at least 400° C., at least 450° C., or at least 500° C. The second onset temperature may be 800° C. or less, or 700° C. or less, or 650° C. or less, or 600° C. or less, or 550° C. or less, or 500° C. or less, or 450° C. or less.

The carbon nanotubes may be produced at a carbon nanotube formation temperature. This is typically higher than the second onset temperature. Preferably, the carbon nanotube formation temperature is at least 900° C., for example at least 950° C., 1000° C., 1050° C., 1100° C. or 1150° C.

Preferably, the steps of:
    initiating growth of catalyst particles;
    subsequently arresting the growth of the catalyst particles using an arresting agent; and
    contacting the catalyst particles with a carbon source to produce carbon nanotubes
are all carried out in the same reaction chamber.

Each (e.g. all) of these steps may be carried out in the gas phase.

The arresting agent source substance, the catalyst source substance and the carbon source may pass through the reaction chamber in a flow direction. For example, the arresting agent source substance, the catalyst source substance and the carbon source may pass through the chamber in the gas phase, e.g. in said flow direction. The arresting agent source substance, the catalyst source substance and the carbon source may be carried through the chamber as part of a gas stream. The gas stream may include an inert gas, such as a noble gas, for example helium or argon. The gas stream may include a reductive gas, for example hydrogen.

The conditions inside the reactor may vary along the flow direction. For example, the temperature in the reaction chamber may vary along the flow direction. The temperature may increase from the first onset temperature to the second onset temperature along the flow direction. The temperature may then change (e.g. increase) to the carbon nanotube formation temperature. For example, the reaction chamber may be a furnace.

Preferably, the catalyst particles comprise transition metal atoms. For example, the catalyst particles may comprise iron, cobalt and/or nickel atoms, preferably iron atoms. Accordingly, it may be preferred that the catalyst source substance (e.g. compound) comprises at least one transition metal atom, for example at least one iron atom, at least one nickel atom and/or at least one cobalt atom. Preferably, the catalyst source substance (e.g. compound) comprises at least one iron atom. These atoms may be released on degradation of the catalyst source substance (e.g. compound).

(As used herein, the word "atom" is understood to include ions of the relevant atoms. For example, the catalyst particles and/or the catalyst source substance (e.g. compound) may include one or more transition metal ions.)

For example, the catalyst source substance may be a transition metal complex, for example a transition metal complex including one, or preferably two, cyclopentadienyl ligands. Alternatively or additionally, the transition metal complex may include other ligands, such as one or more carbonyl ligands. The transition metal complex may include only hydrocarbon ligands.

For example, the catalyst particle source substance may be ferrocene. Other suitable catalyst particle source substances include other metalocenes, such as nickelocene and cobaltocene. Metal carbonyl compounds are also suitable, for example cobalt carbonyl (e.g. dicobalt octacarbonyl), nickel carbonyl (e.g. nickel tetracarbonyl) and iron carbonyl (e.g. iron pentacarbonyl). It will be understood that transition metal complexes having a mixture of cyclopentadienyl ligands and carbonyl ligands may also be suitable.

It will be understood that the catalyst source substance is preferably a substance which begins thermal degradation at the first onset temperature, for example as set out above. Preferably, the catalyst source substance begins thermal degradation at the first onset temperature under the conditions employed in the method of the invention, for example under reductive conditions.

Preferably, the arresting agent is sulphur. Preferably, the arresting agent source substance (e.g. compound) comprises at least one sulphur atom. The sulphur atom may be released on degradation of the arresting agent source substance. The arresting agent source substance may be a compound comprising at least one sulphur atom and at least one carbon atom covalently bonded to the sulphur atom. In this case, at least one carbon-sulphur covalent bond may be broken on degradation of the arresting agent source substance, in order to release the sulphur atom.

A typical arresting agent source substance is carbon disulphide (CDS).

Alternatively, the arresting agent source substance may be a compound comprising at least one sulphur atom and at least one hydrogen atom covalently bonded to the sulphur atom. In this case, at least one hydrogen-sulphur covalent bond may be broken on degradation of the arresting agent source substance, in order to release the sulphur atom. Accordingly, it will be understood that a further suitable arresting agent is hydrogen sulphide ($H_2S$).

A further suitable arresting agent source substance is elemental sulphur. For example, solid sulphur may be supplied to the reaction chamber. Sulphur atoms, ions, radicals or molecules may be released within the reaction chamber, for example by vaporisation or sublimation of the elemental sulphur (e.g. solid sulphur). It will be understood that this release of sulphur atoms, ions, radicals or molecules, e.g. by sublimation or vaporisation, can be considered to be arresting agent source substance degradation (e.g. thermal degradation). Alternatively, gaseous sulphur may be supplied to the reaction chamber.

It will be understood that the arresting agent source substance (e.g. compound) is preferably a substance which begins thermal degradation at the second onset temperature, for example as set out above. Preferably, the arresting agent source substance (e.g. compound) begins thermal degradation at the second onset temperature under the conditions employed in the method of the invention, for example under reductive conditions.

It will be understood that the catalyst particles may comprise transition metal atoms, such as iron, cobalt and/or nickel atoms. The catalyst particles may comprise sulphur atoms. The catalyst particles may consist of transition metal atoms such as iron atoms, sulphur atoms, and incidental impurities. In a particularly preferred embodiment, the catalyst particles may comprise an inner core of transition metal atoms surrounded by a shell or cage of sulphur atoms.

The degradation of catalyst source substance and/or the degradation of arresting agent source substance may be carried out under reductive conditions, for example in the presence of hydrogen.

The amount of catalyst source substance and arresting agent source substance supplied may provide a molar ratio of transition metal atoms to sulphur atoms of 50:1 or less, more preferably 40:1, 30:1, 20:1, 15:1 or 10:1 or less. Preferably, the molar ratio of transition metal atoms to sulphur atoms is at least 2:1, more preferably at least 3:1, at least 4:1 or at least 5:1. A typical molar ratio of transition metal atoms to sulphur atoms is 6:1.

A typical molar ratio of carbon atoms to transition metal atoms is 8:1. Preferably, the ratio of carbon atoms to transition metal atoms is at least 2:1, at least 3:1, at least 4:1, or at least 5:1. Preferably, the ratio of carbon atoms to transition metal atoms is 50:1 or less, or 40:1, 30:1, 20:1, 15:1 or 10:1 or less.

The carbon source is not particularly limited. For example, the carbon source may be a $C_1$-$C_{20}$ hydrocarbon, e.g. a $C_1$-$C_{10}$ or $C_1$-$C_5$ hydrocarbon, including alkanes, alkenes and alkynes. For example, ethane and acetylene are suitable. Alternatively, the carbon source may be a $C_1$-$C_{20}$ alcohol, e.g. a $C_1$-$C_{10}$ or $C_1$-$C_5$ alcohol, such as a monohydroxy alcohol. Typical carbon sources include methane and ethanol. It will be understood that mixtures of carbon sources may be employed.

It will be understood that the carbon nanotubes may be produced by chemical vapour deposition, for example thermal chemical vapour deposition or plasma chemical vapour deposition.

The method may further comprise densifying the carbon nanotubes to produce a carbon material. For example, the densification may comprise drawing the carbon nanotubes to form the carbon material. Alternatively or additionally, the densification may include supplying a densification agent to the carbon nanotubes. Suitable densification agents include acetone and divinyl benzene.

Suitable densification methods are described in WO2008/132467 and in Reference 1, which are each incorporated herein by reference in their entirety.

The method may further comprise the step of forming a fibre or film of carbon nanotubes. For example, the method may further comprise the step of drawing the carbon nanotubes into a fibre. The method may further comprise the step of forming a yarn from such fibres.

The method may further comprise the step of forming a carbon nanotube powder, for example by crushing, chopping, cutting or otherwise processing the carbon nanotubes produced.

It will be understood that the carbon material produced by the method, e.g. the fibre, film or yarn, or the carbon nanotube powder produced by the method, may advantageously have one or more of the optional and preferred features described above with reference to the carbon materials and carbon nanotube powders of the present invention.

Similarly, it will be understood that the method of the present invention preferably produces a population of carbon nanotubes having the diameter, chirality and metallic properties described above with respect to the carbon materials and carbon nanotube powders.

The method may further comprise removing some or all of the residual catalyst particles from the carbon nanotubes.

Preferably the method is performed substantially continuously for at least 10 minutes, for example for at least 30 minutes, at least 1 hour or at least 5 hours.

BRIEF DESCRIPTION OF THE DRAWINGS

Preferred embodiments of the invention will now be described, with reference to the accompanying drawings in which.

DETAILED DESCRIPTION OF THE PREFERRED EMBODIMENTS

A preferred embodiment of the method of the present invention will now be described. A schematic flow chart illustration of the method is shown in FIG. 3C, and a schematic illustration of the apparatus used is shown in FIG. 3A.

A gaseous mixture of carbon source (e.g. methane), catalyst source substance (e.g. ferrocene) and arresting agent source substance (e.g. carbon disulphide) is fed into a furnace, carried in a stream of gas (e.g. hydrogen and/or helium). The gas mixture flows through the furnace in a flow direction.

The temperature increases along the flow direction, so that the mixture is first subjected to a first onset temperature, at which temperature the catalyst source substance degrades to initiate growth of catalyst particles. For example, iron atoms may be released, to form catalyst particles comprising iron. Further along the flow direction, the mixture is subjected to a second onset temperature, at which temperature the arresting agent source substance degrades. The arresting agent is thus released, and acts to arrest the growth of the catalyst nanoparticles. The mixture is then subjected to a carbon nanotube formation temperature, and carbon nanotubes are produced.

Figure 3:
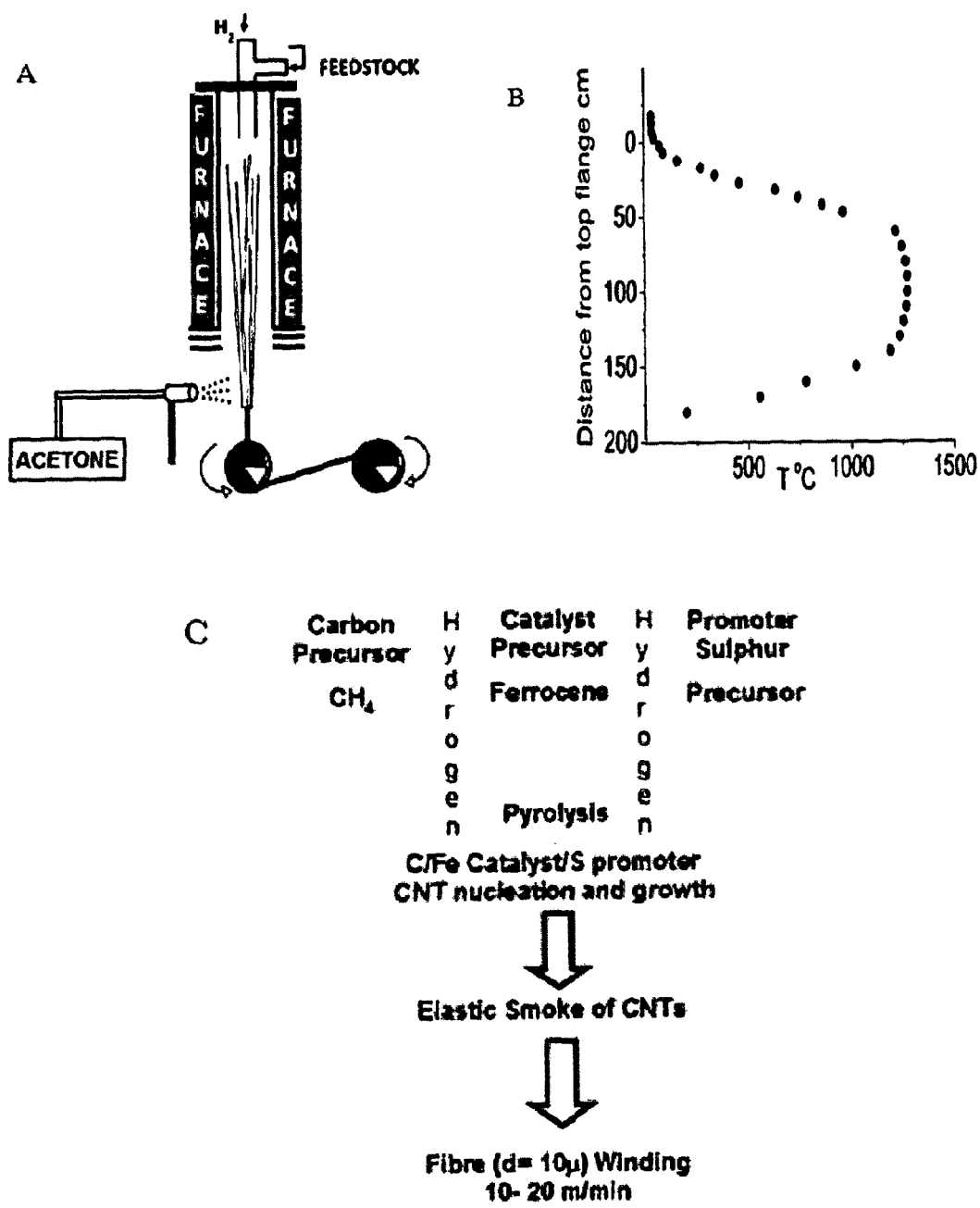
FIG. 3 illustrates an embodiment of the method of the present invention, showing (A) a schematic illustration of the apparatus used, (B) a typical temperature gradient within the reaction chamber, and (C) a schematic flow chart illustration of the method.

As illustrated in FIG. 3A, the resulting carbon nanotubes may be densified by supplying a densification agent (e.g. acetone). The carbon nanotubes may be drawn into a fibre. A typical winding rate is from 10 m s$^{-1}$ to 20 m s$^{-1}$. It will be understood that much higher winding rates may be employed.

A typical temperature gradient within the furnace is illustrated in FIG. 3B.

EXAMPLES

Continuous production of carbon nanotube fibres (schematic as shown in FIG. 3A) was carried out in a vertical ceramic reactor (d=80 mm, l=2 m), with a temperature profile as shown in FIG. 3B. The feedstock contained a carbon precursor (methane) and vapours of a catalyst source substance (ferrocene) and a sulphur source substance, carried by helium. The feedstock was introduced in to the reactor through a steel injector tube (d=12 mm, l=90 mm).

On thermolysis of the feedstock components in a reductive atmosphere of hydrogen followed by synthesis of nanotubes, a plume composed of entangled nanotubes was obtained which was continuously drawn at 20 m min$^{-1}$ and densified with an acetone spray into a fibre. The fibre had a typical diameter of 10 μm.

The effect of two different sulphur precursors, thiophene and carbon disulphide (CDS), on the morphology of the carbon nanotubes constituting the fibres produced was investigated. The input concentrations of the various precursors were optimised experimentally to provide continuous spinning of the fibre. The elemental ratios used are presented in Table 1.

TABLE 1

Input precursor concentrations and the elemental ratios

| | Precursors mol min$^{-1}$ (×10$^{-5}$) | | | | Elemental ratio (×10$^{-3}$) | |
|---|---|---|---|---|---|---|
| | Carbon | Catalyst | Promoter | | Fe/S | Fe/C |
| Case 1 | 170 | 0.21 | C$_4$H$_4$S | 2.5 | 80 | 8 |
| Case 2 | 170 | 0.21 | CS$_2$ | 18 | 6 | 8 |

(The higher input concentration of sulphur where CDS is used, compared to where thiophene is used, reflects the fact that smaller catalyst particles are formed where CDS is used (see below); the surface area to volume ratio of these catalyst particles is higher. Additionally, the CDS becomes available at an earlier stage of catalyst particle growth (again, see below), at which stage there is a higher number density of forming catalyst particles.)

The analyses of the fibre microstructure and the constituting nantotubes were carried out by electron microscopy (FEI Tecnai F20-G2 FEGTEM, JEOL 2000FX and JEOL 6340 FEG), Raman Spectroscopy using a Renishaw Ramanscope 1000 system (incident light of wavelength 633 nm and 514 nm; acquisition time=10 s; laser spot size=1 μm). The mechanical properties of the fibres were investigated with tensile tests using Textechno Favimat, a dedicated fibre testing equipment which employs a load cell with a force and displacement measurement range of 0-2 N (resolution=0.0001 cN) and 0-100 mm (resolution=0.1 micrometer) respectively. Testing was carried out at a standard gauge length of 20 mm and a test-speed of 2 mm min$^{-1}$ to acquire the specific strength and specific stiffness (expressed in N Tex$^{-1}$, these values are numerically equivalent to GPa SG$^{-1}$) of the fibres.

Results

Fibre Composition, Microstructure and Nanostructure

SEM Analysis

Figure 4:
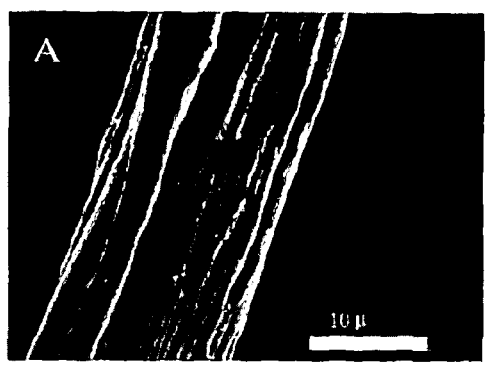
FIG. 4 shows SEM images of carbon materials produced in the examples.
Figure 4:
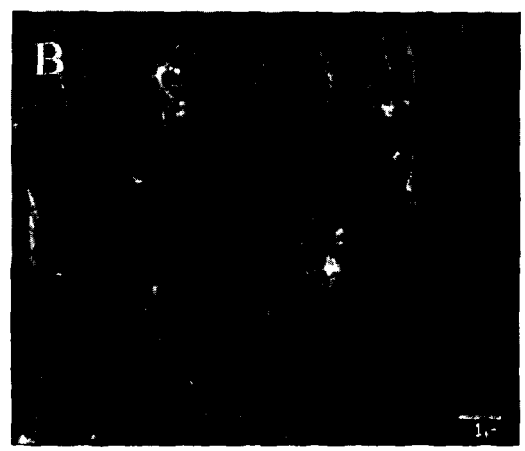
Figure 4:
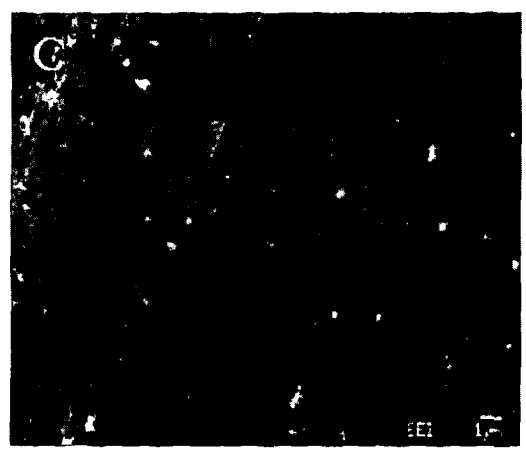

Typical SEM images of the condensed and the internal structure of the uncondensed fibres from both the CDS and thiophene runs are presented in FIG. 4. FIG. 4A shows a typical condensed fibre, FIGS. 4B and 4C shows the internal structure of the fibre prior to acetone densification, where CDS is used as the sulphur precursor (B), and thiophene is used as the sulphur precursor (C). The nanotubes shown are orientated in the fibre direction. It can also be seen that the CDS fibre shows minimal presence of extraneous materials (which are generally by-products of most CVD processes) in comparison to the thiophene fibre.

Raman Spectroscopy

Figure 5:
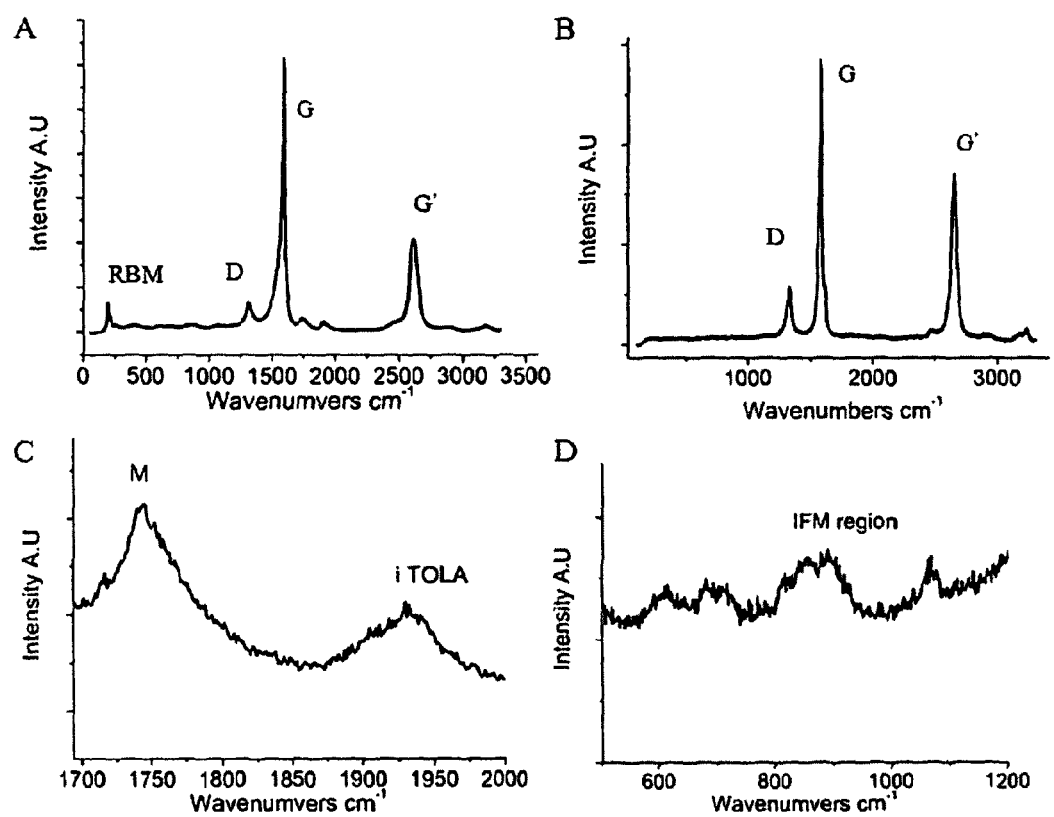
FIG. 5 shows typical Raman spectra of carbon materials produced in the examples.

Raman spectra were acquired on the fibre samples with the polarisation of the incident light parallel to the fibre axis. At least 10 spectra were collected along the length of the fibre per fibre sample. The fibre samples were 1 cm in length, and acquisitions were spaced at equal intervals along the length. At least five samples obtained from each sulphur precursor were examined. The typical spectra for fibres obtained using CDS and thiophene are presented in FIG. 5. FIG. 5A shows a typical spectrum for a fibre obtained using CDS, and FIG. 5B shows a typical spectrum for a fibre obtained using thiophene. FIG. 5C shows the M and iTOLA regions of a typical Raman spectrum for a fibre obtained using CDS, and FIG. 5D shows the IFM region of a typical Raman spectrum for a fibre obtained using CDS.

The positions of the peaks are in the spectra of FIGS. 5A and 5B and the D/G ratios (indicative of fibre purity and crystallinity of the nanotubes) are presented in Table 2.

TABLE 2

The list of positions of the major peaks in the Raman spectra

| | Position cm$^{-1}$ | | | | |
|---|---|---|---|---|---|
| Fibre | RBM | D | G | G' | I$_D$/I$_G$ |
| CDS | 194.5 ± 3.8 | 1320.9 ± 1.1 | 1589.7 ± 0.3 | 2627.2 ± 1.9 | 0.010 ± 0.003 |
| Thiophene | Absent | 1331.3 ± 1.5 | 1583.8 ± 1.8 | 2656.4 ± 2.5 | 0.3 ± 0.04 |

The low D/G ratios shown by the fibres obtained using CDS in comparison to those obtained using thiophene are in agreement with the SEM results. They suggest minimal presence of extraneous materials and low density of defects in the nanotubes produced using CDS. The distinctive intense low frequency ring breathing modes (RBMs) occurring in the spectra from the CDS fibres indicate the presence of single-walled carbon nanotubes. In addition, the upshifted G peak (to 1590 cm$^{-1}$), the downshifted D peak (1320 cm$^{-1}$), the presence of M (1750 cm$^{-1}$), i-TOLA (1950 cm$^{-1}$) and intermediate frequency vibration modes (IFM modes 600-1200 cm$^{-1}$) confirm that the fibres obtained with CDS as the sulphur precursor are composed of mainly single-walled carbon nanotubes. All these vibrational features are completely absent in fibres obtained with thiophene as the sulphur precursor and the G band and D band position occurring at 1582 cm$^{-1}$ and 1331 cm$^{-1}$ are suggestive of the presence of carbon nanotubes with more than one wall.

G Band and RBM Analysis of CDS Fibres

Further analysis of the G band (FIG. 6A) reveals an internal structure and in addition to the G+ feature at 1590 cm$^{-1}$ (Lorentzian fit), the G-band occurs as a broad feature at 1552 cm$^{-1}$ fit with the Breit-Wigner-Fanoline shape which indicates the predominant presence of metallic nanotubes. The Fano line shape is given by:

$$I(\omega) = I_0 \frac{[1 + (\omega - \omega_{BWF})/q\Gamma]^2}{1 + |(\omega - \omega_{BWF})/q\Gamma|^2}$$

where $I_0$, $\omega_0$, $\Gamma$ and q are intensity, normalised frequency, broadening parameter and line shape parameter respectively.

Figure 6:
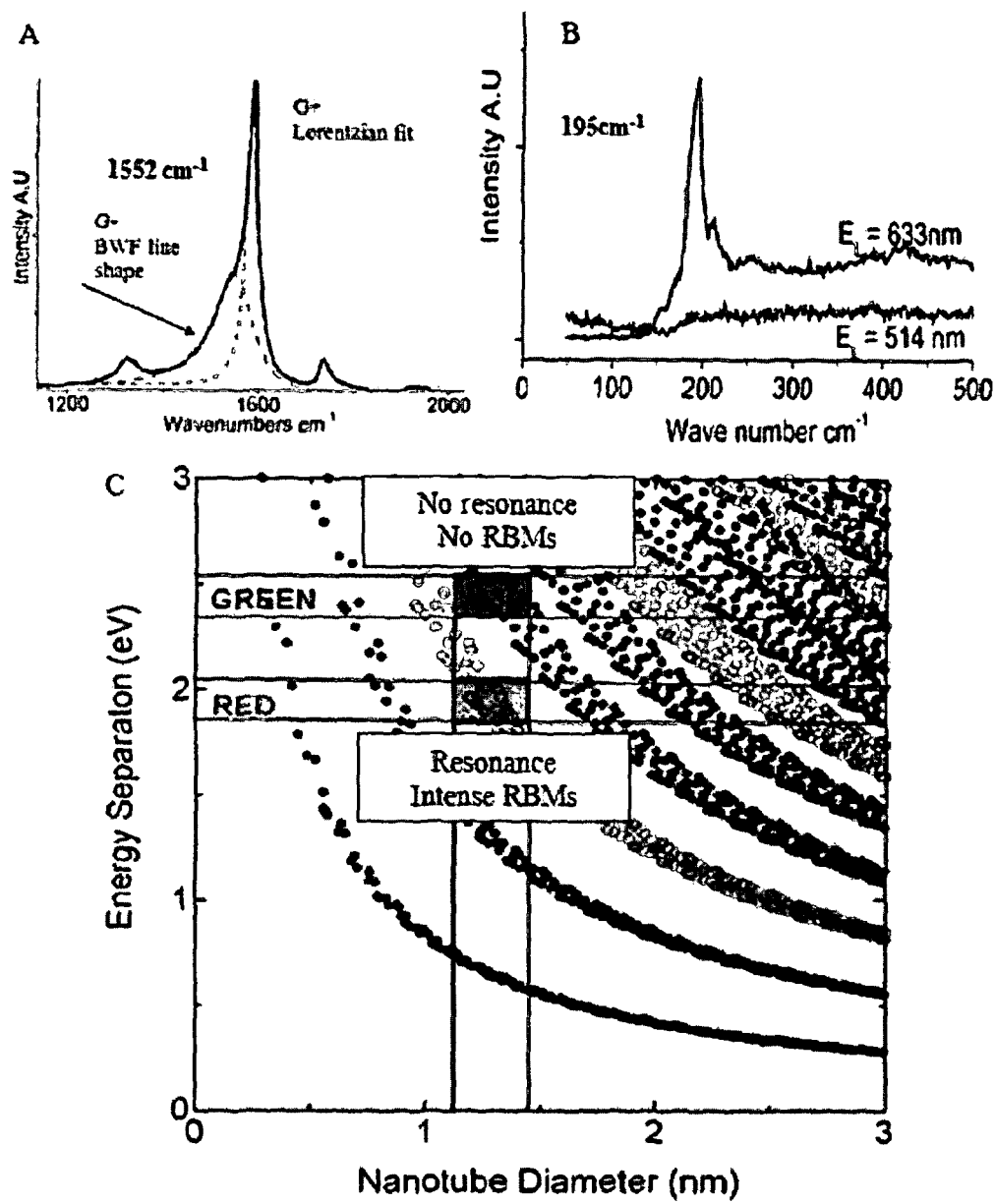
FIG. 6 shows (A) and (B) extracts from a typical Raman spectrum of a carbon material produced in the examples, and (C) an annotated Kataura plot.

(FIG. 6A shows the internal structure of the G band, with the Lorentzian G+ and the G− exhibiting the Fano lineshape (see the above equation) with fit parameters $I_0$, $\omega_0$, $\Gamma$ and q=2256, 1556, 49.5 and −0.20 respectively.)

Figure 1:
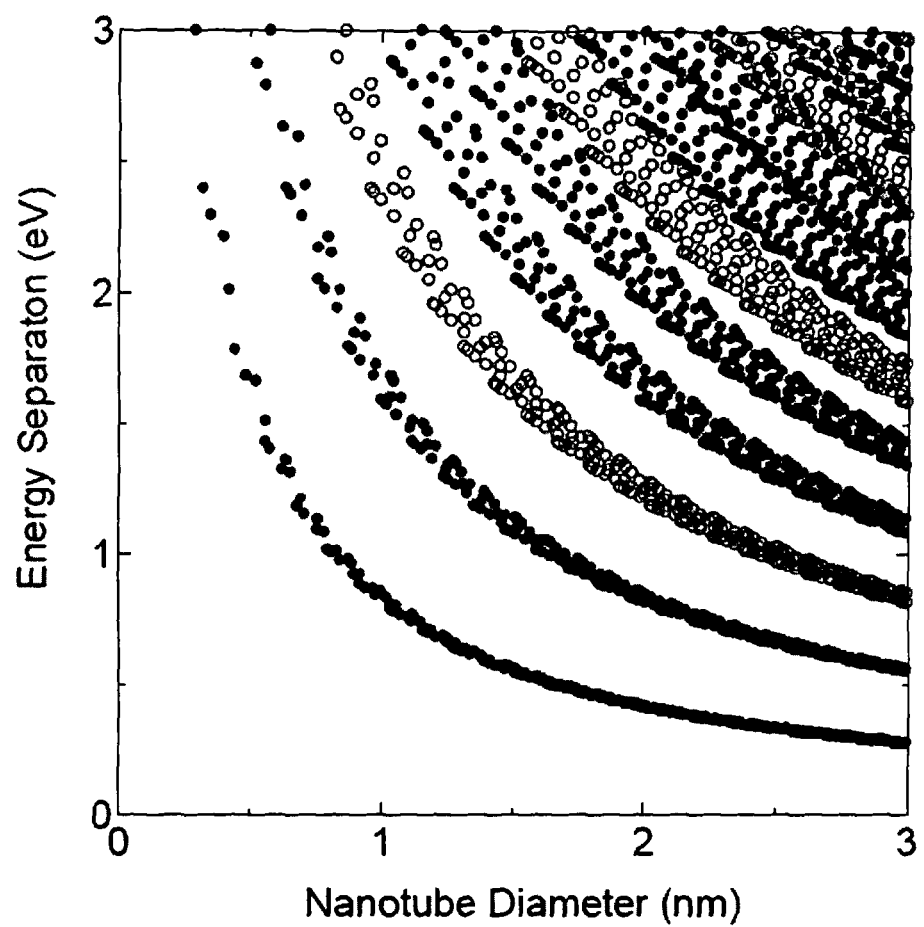
FIG. 1 shows a Kataura plot.
Figure 2A:
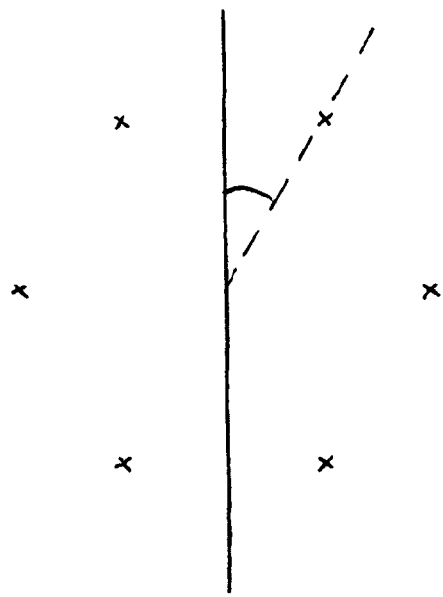
FIG. 2 shows a schematic illustration of typical diffraction patterns obtained for (A) armchair carbon nanotubes, and (B) zigzag carbon nanotubes.
Figure 2B:
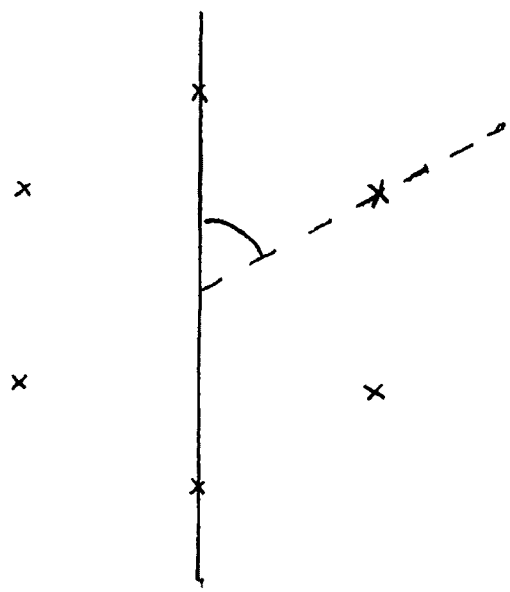

The position of the radial breathing modes (RBMs) can be utilised to obtain the diameters of the nanotubes, as described above. It was observed that all the RBM frequencies noticed in the CDS fibre occur around 200 cm$^{-1}$ at the excitation wavelength of 633 nm (FIG. 6B) corresponding to the diameter range of 1.2±0.2 nm (d=239/$\omega_{RBM}$). This can be mapped to the Kataura plot, which is a theoretical model that relates the diameter of the nanotubes to the optical transition energies. Nanotubes of the same diameter can be either metallic or semiconducting, and the difference in the behaviour is shown in the differences in their optical transition energies. From the Kataura plot (FIG. 1 and FIG. 6C) it can be inferred that nanotubes in the diameter range of 1.1-1.4 nm with optical transition energies in the range of 1.96±0.1 eV are metallic, while those with transition energies in the range of 2.41±0.1 eV are semiconducting (the energy range of 0.1 eV takes in to account any transition energy shifts caused due to environmental effects such as nanotube bundling).

Only those tubes with optical transition energies that are in resonance with the excitation energy (in the case of Raman spectroscopy, the incident laser light) will yield an RBM. While intense RBMs could be obtained with incident light of 633 nm ($E_{excitation}$=1.96 eV), no resonance, and hence no RBMs, was observed when an incident light of 514 nm ($E_{excitation}$=2.41 eV) was used (FIGS. 4B and 4C). This further confirms that the single-walled carbon nanotubes that constitute the CDS fibre are metallic.

(FIG. 6B shows the representative RBM region of a typical Raman spectrum for a fibre obtained using CDS. It has a peak at 195 cm$^{-1}$ with $\lambda_{excitation}$=633 nm and the absence of the RBM peak with $\lambda_{excitation}$=514 nm. FIG. 6C shows the metallic and semiconducting window in the Kataura plot (non-filled circles=metallic nanotubes, filled circles=semiconducting nanotubes) are marked red and green respectively on the original colour version of this drawing for nanotubes in the diameter range of 1.1 to 1.4 nm in correlation to the excitation energies used to acquire the Raman spectra (green region=2.41±0.1 eV, 514 nm; red region=1.96±0.1 eV, 633 nm).)

TEM and Electron Diffraction

Figure 7:
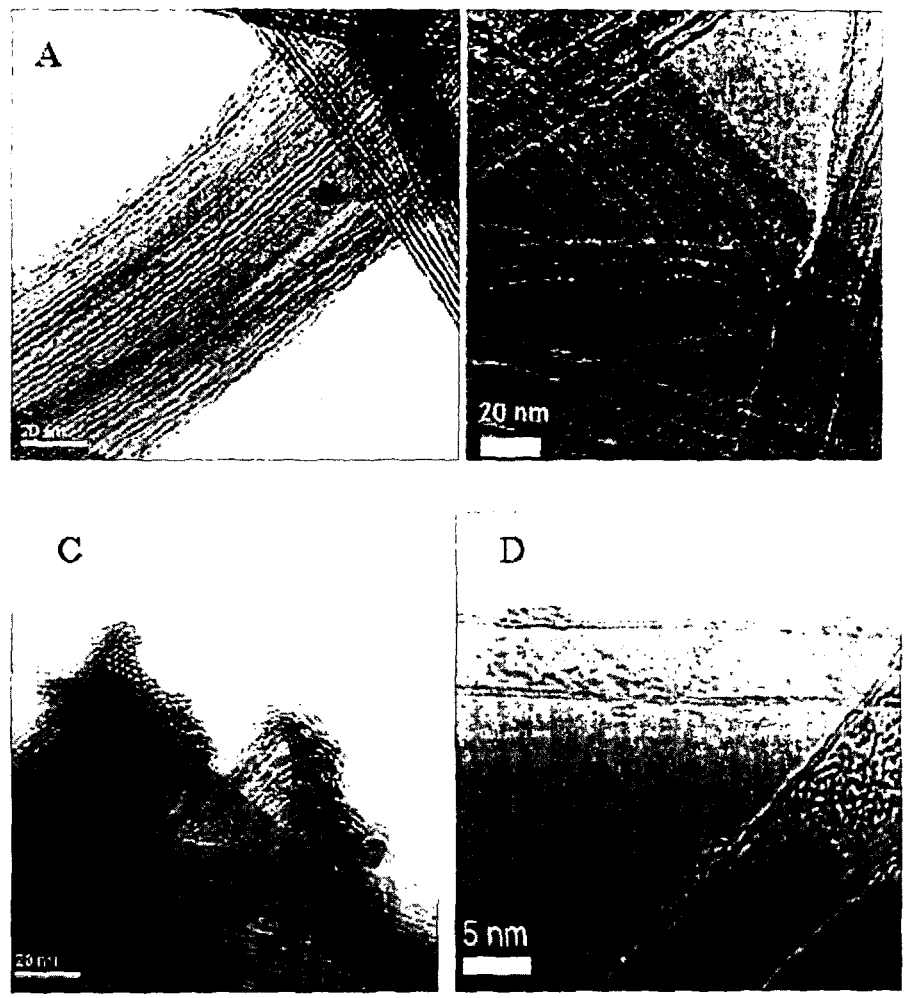
FIG. 7 shows TEM images of carbon materials produced in the examples.

Analysis by transmission electron microscopy indicates that the bundles that constitute the fibres, from both CDS and thiophene, are typically in the diameter range of 30-60 nm (FIGS. 7A and 7B respectively). From HREM analysis, the CDS fibres are composed of SWCNTs and those obtained with thiophene as sulphur precursor are composed of collapsed DWCNTs (FIGS. 7C and 7D respectively), confirming the findings from Raman spectroscopic analysis.

Figure 8A:
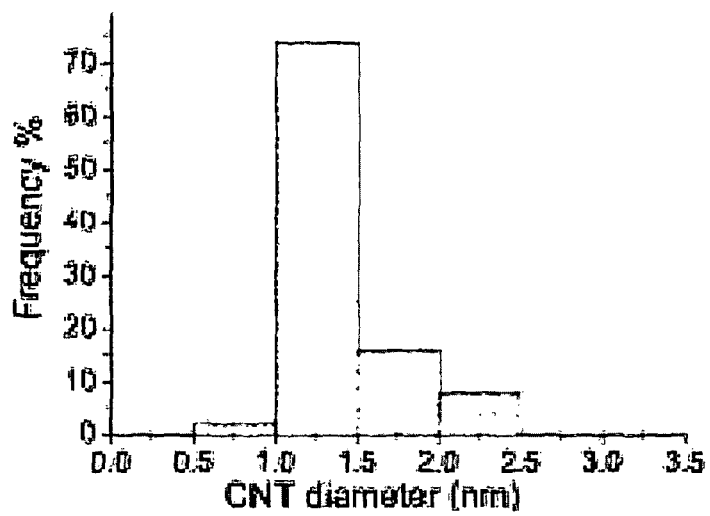
FIG. 8 shows the carbon nanotube diameter distribution of carbon materials produced in the examples, determined using TEM.
Figure 8B:
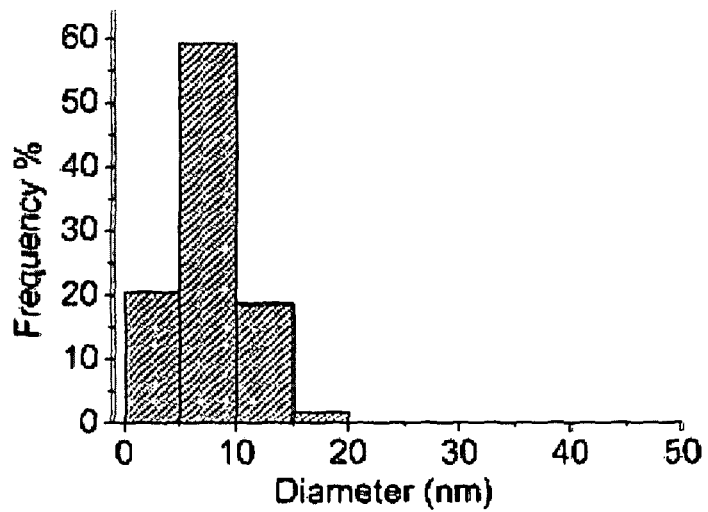

The diameters and diameter distribution of the nanotubes are presented in Table 3 and FIG. 8. It can be seen that the diameters obtained from TEM analysis of the CDS fibres are in close agreement with those obtained from Raman spectroscopy (bulk characterisation).

TABLE 3

Average diameters of the single-walled carbon nanotubes obtained using CDS, and collapsed double-walled carbon nanotubes obtained using thiophene, from TEM and RBM.

| Fibre | Diameter$_{TEM}$ (nm) | Diameter$_{RBM}$ (nm) |
|---|---|---|
| CDS: Metallic SWCNT | 1.4 ± 0.3 | 1.2 ± 0.2 |
| Thiophene: DWCNT | 7.6 ± 2.3 | N/A |

The diameter distributions, determined using TEM are presented in FIG. 8, which shows (A) the diameter distribution of carbon nanotubes obtained using CDS, and (B) the diameter distribution of carbon nanotubes obtained using thiophene.

Electron diffraction was carried out on fibre bundles (e.g. those represented in FIGS. 7A and B). The electron pattern from fibres obtained using CDS showed a pattern of clear spots, positioned to indicate armchair (m,n) tubes, with a chiral angle of 30°. In correlation with the diameter measurements, this suggests that the tubes are (10,10) tubes. Armchair tubes are metallic and hence, these results are in agreement with the characterisation by Raman spectroscopy. The electron diffraction patterns from the fibres obtained from thiophene are composed of continuous rings corresponding to (10-10) and (11-20) reflections, which shows that the nanotubes have a continuous distribution of helicities (i.e. there is a mixture of different chiralities).

Figure 11A:
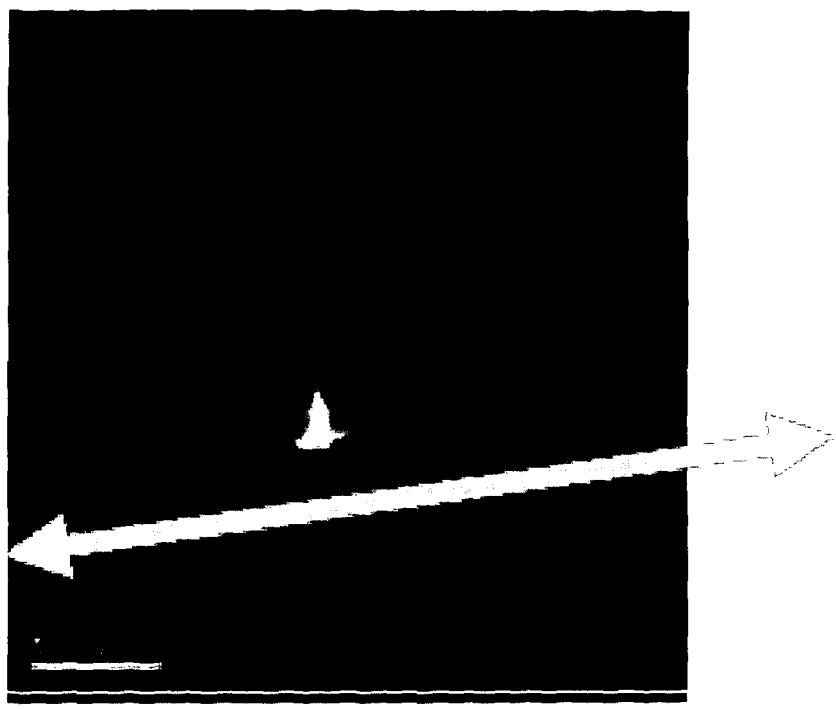
FIG. 11 shows (A) an example electron diffraction pattern obtained from a bundle of carbon nanotubes having armchair chirality, and (B) a marked up version of the pattern of FIG. 11A with oval marks indicating the location of the diffraction spots.
Figure 11B:
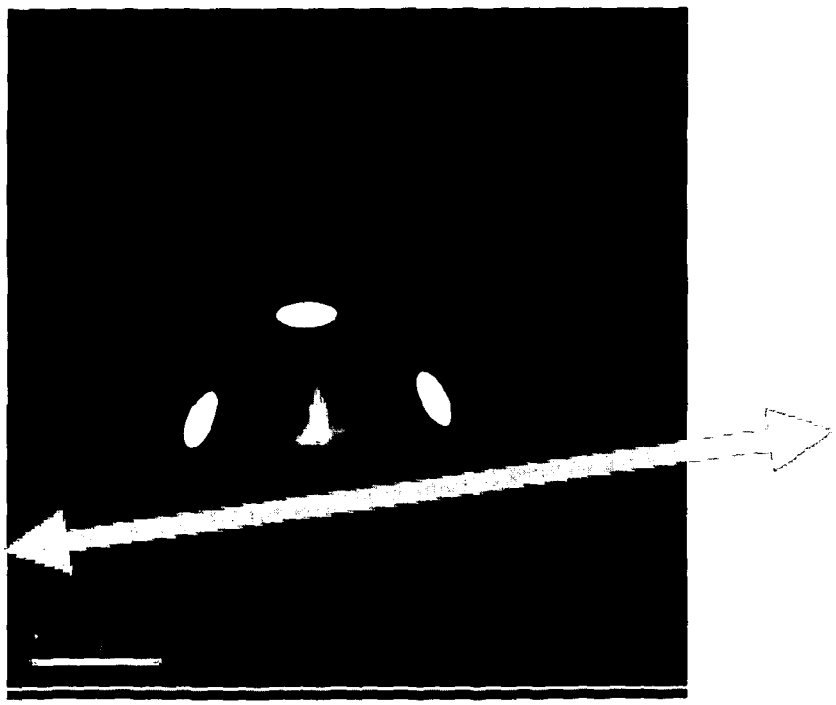
Figure 12A:
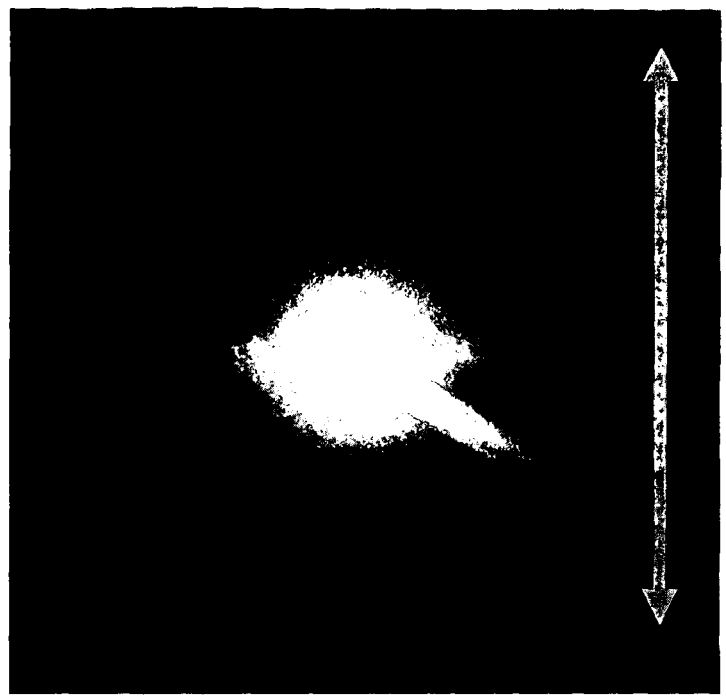
FIG. 12 shows (A) an example electron diffraction pattern obtained from a bundle of carbon nanotubes having armchair chirality, and (B) a marked up version of the pattern of FIG. 11A with oval marks indicating the location of the diffraction spots.
Figure 12B:
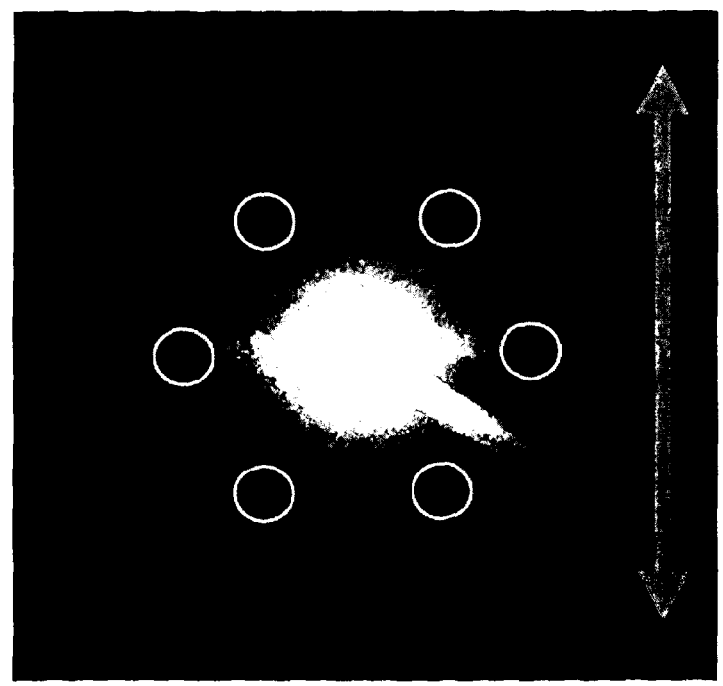

An example electron diffraction pattern is shown in FIG. 11A, for a bundle of carbon nanotubes having armchair chirality. Only half of the hexagonal pattern of spots is shown, the remaining spots are obscured by a shade. The arrow indicates the principal axis of the carbon nanotubes. FIG. 11B shows the same image, which has been marked up to show the location of the diffraction spots. The position of the three visible diffraction spots of the hexagonal pattern is indicated with white oval marker points. A similar example electron diffraction pattern is shown in FIG. 12A. FIG. 12B shows the same image as FIG. 12A, marked up to highlight the location of the diffraction spots.

Catalyst Particles

Figure 9A:
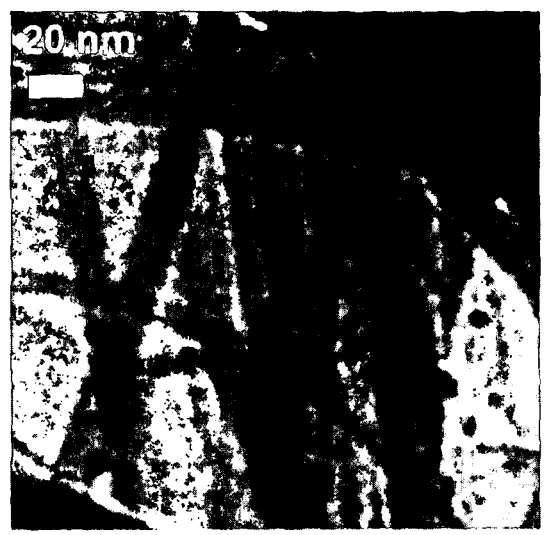
FIG. 9 shows (A) a HREM image of catalyst particles withdrawn from the reactor in the examples, and (B) the diameter distribution of these particles.
Figure 9B:
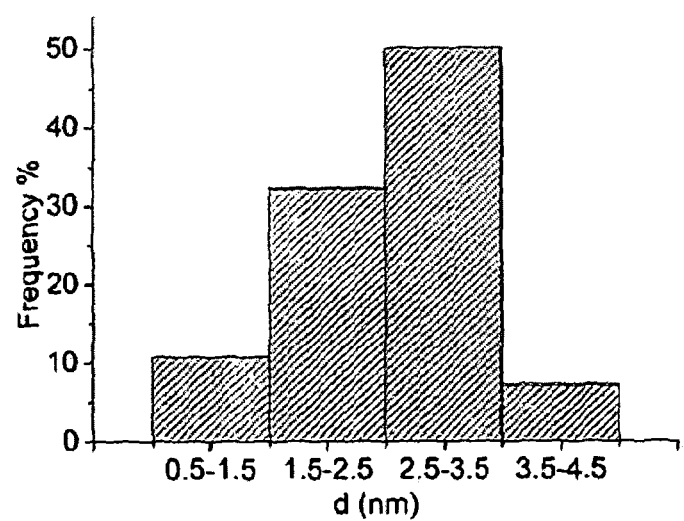

The catalyst particles formed when CDS is used were examined. The particles were frozen and withdrawn from the zone of the reactor where they form (in the temperature range 400-600 C. A HREM image of the withdrawn catalyst particles is shown in FIG. 9A. The diameter distribution of these particles, determined using HREM is shown in FIG. 9B. This figure shows that the catalyst particles have a narrow size distribution.

The average diameter values of the 'frozen' catalyst particles is 2.5±0.8 nm and the ratio of the average diameter of the catalyst particles to that of the single-walled carbon nanotubes is about 1.8, which is in close agreement with that reported in the literature.

Fibre Properties

Mechanical and Electrical Properties

The mechanical properties of the metallic single-walled carbon nanotube fibre (obtained using CDS) and the double-walled carbon nanotube fibre (obtained using thiophene) are presented in Table 4. The fibres composed of collapsed DWCNT fibres are expected to be superior mechanically, due to the large contact area between the nanotubes held by van der Waals forces within the bundles, which is evinced in the tensile strength and stiffness values.

TABLE 4

Fibre characteristics and mechanical attributes properties of the metallic SWCNT and DWCNT fibres along with those of copper wire of electrical wiring grade.

| | Fibre characteristics | | Mechanical properties | |
|---|---|---|---|---|
| Material | Diameter (µm) | Linear density (g Km$^{-1}$) | Sp. Strength (GPa SG$^{-1}$) | Sp. Stiffness (GPa SG$^{-1}$) |
| Metallic SWCNT fibre | 10-15 | 0.04 | 0.5 | 10 |
| DWCNT fibre | 10-15 | 0.04 | 1 | 20 |
| Copper AWG 10 | 1820 | 2.3 × 10$^4$ | 0.03 | 14 |

Table 5 below illustrates typical properties of materials, including a non-optimised fibre within the scope of the present invention (final row).

| Material | Conductivity S/m × $10^6$ | Volumetric density g/m$^3$ × $10^6$ | Linear density g/km | Specific conductivity S/m/g/m$^3$ | Current density (A/mm$^2$) | Specific Strength GPa/SG | Specific Stiffness GPa/SG |
|---|---|---|---|---|---|---|---|
| Copper (electrolytic) | 58 | 8.9 | — | 6.5 | 2-10 | 0.025 | 13 |
| Aluminium | 38 | 2.7 | — | 14.1 | 4 | 0.026 | 26 |
| Steel/Iron | 10 | 7.9 | — | 1.3 | — | 0.038 | 27 |
| Carbon fibre T300 TORAY | 0.06 | 1.8 | — | 0.03 | — | 1.96 | 128 |
| High performance carbonfibre (M60J) TORAY | 0.14 | 1.9 | — | 0.07 | — | 2.06 | 309 |
| CNT yarn "non metallic" | 0.1-0.7 | 0.8-1.2 | 0.02-0.1 (depending on winding rate) | 0.1-0.7 | 30 | 0.8-1.2 | 60-140 |
| CNT yarn "metallic" | 0.7-3 (so far) | 0.8-1.2 | 0.02-0.1 (depending on winding rate) | 0.7-3 | 80 | 0.8-1 | 60-140 |

In this table, specific conductivity parameter which takes into account both electrical conductivity and the density of a conductor. In Table 5 below, the values for specific conductivity were estimated, from experimentally obtained values for conductance, length and linear density, using the equation below:

$$\sigma' = \frac{G \cdot L}{LD} 10^3$$

wherein G is conductance (in Siemens), L is length (in metres), and LD is linear density (in tex, or g km$^{-1}$), and $\sigma'$ is specific conductivity in:

$$\frac{S\ m^{-1}}{g\ cm^{-3}}$$

It will be understood that both the electrical conductivity and the density of a conductor are important in many engineering applications, for example in overhead power lines.

In the above examples, without wishing to be bound by theory, it is believed that the thermal degradation of ferrocene in hydrogen atmosphere begins at about 673K to yield iron atoms (d=0.3 nm) which subsequently grow into nanoparticles (which act as catalysts for the nucleation and growth of nanotubes). These nanoparticles are believed to pass through the reactor in the flow direction, along the temperature profile. The thermal degradation of the sulphur precursor (CDS or thiophene) in the reaction feedstock leads to the interaction of the iron nanoparticles with sulphur. We call this sulphudisation. The addition of sulphur, a recognised promoter in carbon nanotube growth, allows the production of long carbon nanotubes (typically mm). It is believed that this can enhance the mechanical integrity of the mass of carbon nanotubes produced. This can facilitate the production of carbon materials, such as fibres and films, from the carbon nanotubes.

The above examples probe the effect of different sulphur precursors, with varied thermal degradation behaviour. This alters when the sulphur becomes available to the growing iron nanoparticles. Sulphur is believed to act as an arresting agent, stopping or slowing the nanoparticle growth. This is believed to affect the structure of the carbon nanotubes formed.

The thermal stability of CDS is lower than thiophene, especially in a reductive hydrogen atmosphere. The adjacent double bonds in CDS are expected to readily undergo hydrogenation followed by elimination of sulphur in the form of $H_2S$. This compound readily sulphudises the iron nanoparticles. Thiophene on the other hand is resistive to hydrogenolysis owing to its stability as an aromatic compound. Where CDS is used, the temperature at which sulphur becomes available to the catalyst particles is lower than the temperature at which sulphur becomes available to the catalyst particles when thiophene is used.

Figure 10:
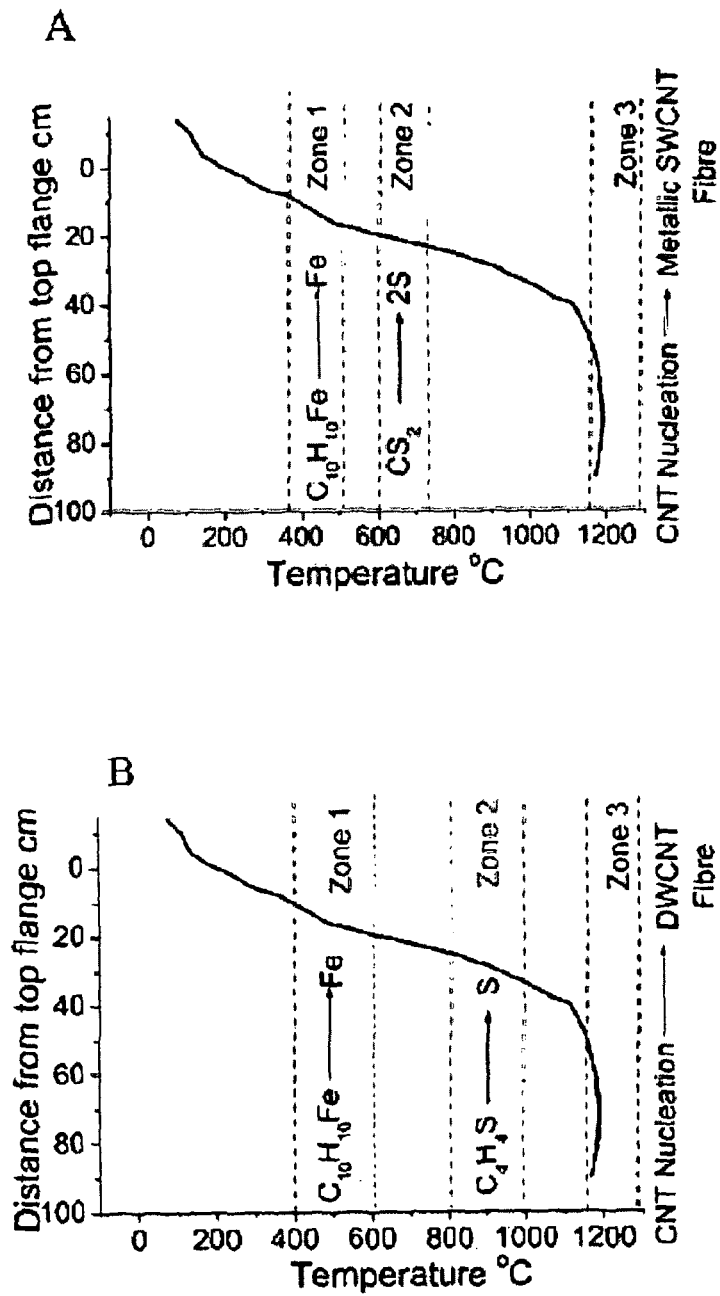
FIG. 10 shows the thermal degradation temperatures of reactants used in the examples, and relates them to the temperature profile in the reactor.

As shown in FIG. 10A, the thermal degradation temperatures of ferrocene and CDS are close to each other. Therefore, it is believed that the catalyst particles are sulphudised in the early stages of their growth. This is believed to result in catalyst particles wherein at least 70% by number of the catalyst particles have a diameter in the range from 0.5 nm to 4.5 nm. It is believed that the small catalyst particles tend to provide single-walled carbon nanotubes.

In contrast, there is a much larger difference between the thermal degradation temperatures of thiophene and ferrocene, as shown in FIG. 10B. Therefore, the nanoparticles grow for much longer before they encounter sulphur obtained by degradation of thiophene. Before this, the iron particles grow to 8-10 nm in diameter. These larger nanoparticles tend to produce larger diameter carbon nanotubes, which tend to be double-walled and collapsed.

The experiments were repeated with ethanol as the carbon source (ethanol decomposition yields a carbon supply at much lower temperatures (about 873K) than methane). In the case of carbon nanotube fibres obtained from ethanol, CDS lead to the formation of metallic single-walled carbon nanotubes, while thiophene yielded collapsed double-walled carbon nanotubes. In addition, the effect of the presence of helium (recently reported to play a role in the formation of metallic nanotubes; Reference 3) on the formation of metallic nanotubes was tested, by carrying out the ethanol runs in the absence and presence of helium. Both yielded identical results and the presence of helium did not seem to significantly affect the process.

The preferred embodiments have been described by way of example only. Modifications to these embodiments, further embodiments and modifications thereof will be apparent to the skilled person and as such are within the scope of the present invention.

REFERENCES

The content of each of the following references is incorporated herein in its entirety.
1. Koziol, K. et al; High-Performance Carbon Nanotube Fiber; Science 318, 1892 (2007)
2. Motta, M. S. et al; The Role of Sulphur in the Synthesis of Carbon Nanotubes by Chemical Vapour Deposition at High Temperatures; J. Nanosci. Nanotech. 8 1-8 (2008)
3. Harutyunyan et al; Preferential Growth of Single-Walled Carbon Nanotubes with Metallic Conductivity; Science 326, 116 (2009)
4. Carbon Nanotubes; Ed: Jorio, Dresselhaus and Dresselhaus Springer Verlag Heidelberg 2008
5. Kataura et al; Optical Properties of Single-Wall Carbon Nanotubes; Syn. Met. 103 2555-2558 (1999)

What is claimed is:

1. A method of producing carbon nanotubes, the method comprising:
providing a plurality of floating catalyst particles, wherein at least 70% by number of the catalyst particles have a diameter less than or equal to 4.5 nm; and
contacting the floating catalyst particles with a gas phase carbon source at a carbon nanotube formation temperature of at least 900° C. to produce carbon nanotubes, wherein the floating catalyst particles are provided by:
initiating growth of the catalyst particles by thermal degradation of a catalyst source substance, the thermal degradation of the catalyst source substance beginning at a first onset temperature being 700° C. or less, and subsequently
arresting the growth of the catalyst particles using an arresting agent the arresting agent being sulfur, the arresting agent being provided to the catalyst particles by thermal degradation of an arresting agent source substance comprising carbon disulphide (CDS), the thermal degradation of the arresting agent source substance beginning at a second onset temperature being 800° C. or less, wherein the second onset temperature is in the range of temperatures from 10° C. more than the first onset temperature to 350° C. more than the first onset temperature; and
wherein the arresting agent source substance, the catalyst source substance and the carbon source pass through the reaction chamber in a gas phase and in a flow direction, wherein the temperature in the reaction chamber varies along the flow direction from the first onset temperature to the second onset temperature to the carbon nanotube formation temperature.

2. The method according to claim 1 wherein the first onset temperature is in the range from 300° C. to 700° C., and wherein the second onset temperature is in the range from 350° C. to 750° C.

3. The method according to claim 1, further comprising performing the contacting step substantially continuously for at least 10 minutes.

* * * * *